US012744574B2

(12) United States Patent
Khoshnevisan et al.

(10) Patent No.: US 12,744,574 B2
(45) Date of Patent: Sep. 22, 2026

(54) LINKED REPORTING OCCASIONS OF CHANNEL STATE INFORMATION REPORT SETTINGS FOR NON-COHERENT JOINT TRANSMISSION

(71) Applicant: QUALCOMM Incorporated, San Diego, CA (US)

(72) Inventors: Mostafa Khoshnevisan, San Diego, CA (US); Chenxi Hao, Beijing (CN); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 541 days.

(21) Appl. No.: 18/260,901

(22) PCT Filed: Apr. 1, 2021

(86) PCT No.: PCT/CN2021/084841
§ 371 (c)(1),
(2) Date: Jul. 10, 2023

(87) PCT Pub. No.: WO2022/205275
PCT Pub. Date: Oct. 6, 2022

(65) Prior Publication Data

US 2024/0063869 A1 Feb. 22, 2024

(51) Int. Cl.
*H04B 7/06* (2006.01)
*H04W 24/08* (2009.01)
*H04W 24/10* (2009.01)

(52) U.S. Cl.
CPC .......... *H04B 7/0626* (2013.01); *H04W 24/08* (2013.01); *H04W 24/10* (2013.01)

(58) Field of Classification Search
None
See application file for complete search history.

(56) References Cited

U.S. PATENT DOCUMENTS

2019/0036569 A1 1/2019 Deng et al.
2020/0036473 A1* 1/2020 Nemeth .................. H04L 1/203
(Continued)

FOREIGN PATENT DOCUMENTS

CN 111614389 A 9/2020
EP 3609100 A1 2/2020
(Continued)

OTHER PUBLICATIONS

CATT: "CSI Enhancements for MTRP and FR1 FDD with Partial Reciprocity", 3GPP TSG RAN WG1 Meeting #102-e, R1-2005689, e-Meeting, Aug. 17-28, 2020, the Whole Document, 8 Pages.
(Continued)

*Primary Examiner* — Scott M Sciacca
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may jointly measure channel state information (CSI) resources corresponding to a first reporting occasion of a first CSI report setting and a second reporting occasion of a second CSI report setting if the first reporting occasion is linked to the second reporting occasion based at least in part on a slot position of the first reporting occasion relative to a slot position of the second reporting occasion. The first CSI report setting may be associated with the second CSI report setting for reporting CSI associated with non-coherent joint transmission. The UE may transmit a first report for the first CSI report setting at the first reporting occasion and a second report for the second CSI report setting at the second reporting occasion. Numerous other aspects are described.

30 Claims, 14 Drawing Sheets

(56) References Cited

U.S. PATENT DOCUMENTS

| | | | | |
|---|---|---|---|---|
| 2020/0350967 | A1* | 11/2020 | Xu | H04B 7/0626 |
| 2021/0028823 | A1 | 1/2021 | Park et al. | |
| 2024/0106614 | A1* | 3/2024 | Gao | H04B 7/022 |

FOREIGN PATENT DOCUMENTS

| | | | | |
|---|---|---|---|---|
| WO | WO-2019192013 A1 | | 10/2019 | |
| WO | WO-2020052428 A1 | * | 3/2020 | H04L 5/0094 |

OTHER PUBLICATIONS

International Search Report and Written Opinion—PCT/CN2021/084841—ISA/EPO—Jan. 6, 2022.

Supplementary European Search Report—EP21933935—Search Authority—Munich—Nov. 19, 2024.

ZTE: "CSI enhancements for Multi-TRP and FR1 FDD reciprocity", 3GPP TSG RAN WG1 #104-e, R1-2100291, e-Meeting, Jan. 25-Feb. 5, 2021, Jan. 19, 2021, pp. 1-15.

* cited by examiner

LINKED REPORTING OCCASIONS OF CHANNEL STATE INFORMATION REPORT SETTINGS FOR NON-COHERENT JOINT TRANSMISSION

CROSS-REFERENCE TO RELATED APPLICATION

This Patent Application is a 371 national stage of PCT Application No. PCT/CN2021/084841 filed on Apr. 1, 2021, entitled "LINKED REPORTING OCCASIONS OF CHANNEL STATE INFORMATION REPORT SETTINGS FOR NON-COHERENT JOINT TRANSMISSION," and assigned to the assignee hereof. The disclosure of the prior Application is considered part of and is incorporated by reference into this Patent Application in its entirety.

FIELD OF THE DISCLOSURE

Aspects of the present disclosure generally relate to wireless communication and to techniques and apparatuses for linking reporting occasions of channel state information (CSI) report settings for reporting CSI for non-coherent joint transmission.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" or "forward link" refers to the communication link from the BS to the UE, and "uplink" or "reverse link" refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes jointly measuring channel state information (CSI) resources corresponding to a first reporting occasion of a first CSI report setting and a second reporting occasion of a second CSI report setting if the first reporting occasion is linked to the second reporting occasion based at least in part on a slot position of the first reporting occasion relative to a slot position of the second reporting occasion. The first CSI report setting may be associated with the second CSI report setting for reporting CSI associated with non-coherent joint transmission (NCJT). The method may include transmitting, based at least in part on the measuring, a first report for the first CSI report setting at the first reporting occasion and a second report for the second CSI report setting at the second reporting occasion.

In some aspects, a method of wireless communication performed by a UE includes receiving an activation indication that activates one or more of a first semi-persistent (SP) CSI report setting or a second SP CSI report setting and jointly measuring CSI resources corresponding to a first reporting occasion of the first SP CSI report setting and a second reporting occasion of the second SP CSI report setting if the first SP CSI report setting and the second SP CSI report setting are both activated and associated with each other for reporting CSI associated with NCJT. The method may include transmitting, based at least in part on the measuring, a first report for the first report setting at the first reporting occasion and a second report for the second report setting at the second reporting occasion.

In some aspects, a UE for wireless communication includes a memory and one or more processors, coupled to the memory, configured to jointly measure CSI resources corresponding to a first reporting occasion of a first CSI report setting and a second reporting occasion of a second CSI report setting if the first reporting occasion is linked to the second reporting occasion based at least in part on a slot position of the first reporting occasion relative to a slot position of the second reporting occasion, where the first CSI report setting is associated with the second CSI report setting for reporting CSI associated with NCJT. The memory and the one or more processors may be configured to transmit, based at least in part on the measuring, a first report for the first CSI report setting at the first reporting occasion and a second report for the second CSI report setting at the second reporting occasion.

In some aspects, a UE for wireless communication includes a memory and one or more processors, coupled to the memory, configured to receive an activation indication that activates one or more of a first SP CSI report setting or a second SP CSI report setting and jointly measure CSI resources corresponding to a first reporting occasion of the first SP CSI report setting and a second reporting occasion of the second SP CSI report setting if the first SP CSI report setting and the second SP CSI report setting are both activated and associated with each other for reporting CSI associated with NCJT. The memory and the one or more processors may be configured to transmit, based at least in part on the measuring, a first report for the first report setting at the first reporting occasion and a second report for the second report setting at the second reporting occasion.

In some aspects, a non-transitory computer-readable medium storing a set of instructions for wireless communication includes one or more instructions that, when executed by one or more processors of a UE, cause the UE to jointly measure CSI resources corresponding to a first reporting occasion of a first CSI report setting and a second reporting occasion of a second CSI report setting if the first reporting occasion is linked to the second reporting occasion based at least in part on a slot position of the first reporting occasion relative to a slot position of the second reporting occasion, where the first CSI report setting is associated with the second CSI report setting for reporting CSI associated with NCJT, and transmit, based at least in part on the measuring, a first report for the first CSI report setting at the first reporting occasion and a second report for the second CSI report setting at the second reporting occasion.

In some aspects, a non-transitory computer-readable medium storing a set of instructions for wireless communication includes one or more instructions that, when executed by one or more processors of a UE, cause the UE to receive an activation indication that activates one or more of a first SP CSI report setting or a second SP CSI report setting, jointly measure CSI resources corresponding to a first reporting occasion of the first SP CSI report setting and a second reporting occasion of the second SP CSI report setting if the first SP CSI report setting and the second SP CSI report setting are both activated and associated with each other for reporting CSI associated with NCJT, and transmit, based at least in part on the measuring, a first report for the first report setting at the first reporting occasion and a second report for the second report setting at the second reporting occasion.

In some aspects, an apparatus for wireless communication includes means for jointly measuring CSI resources corresponding to a first reporting occasion of a first CSI report setting and a second reporting occasion of a second CSI report setting if the first reporting occasion is linked to the second reporting occasion based at least in part on a slot position of the first reporting occasion relative to a slot position of the second reporting occasion, where the first CSI report setting is associated with the second CSI report setting for reporting CSI associated with non-coherent joint transmission, and means for transmitting, based at least in part on the measuring, a first report for the first CSI report setting at the first reporting occasion and a second report for the second CSI report setting at the second reporting occasion.

In some aspects, an apparatus for wireless communication includes means for receiving an activation indication that activates one or more of a first SP CSI report setting or a second SP CSI report setting, means for jointly measuring CSI resources corresponding to a first reporting occasion of the first SP CSI report setting and a second reporting occasion of the second SP CSI report setting if the first SP CSI report setting and the second SP CSI report setting are both activated and associated with each other for reporting CSI associated with non-coherent joint transmission, and means for transmitting, based at least in part on the measuring, a first report for the first report setting at the first reporting occasion and a second report for the second report setting at the second reporting occasion.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
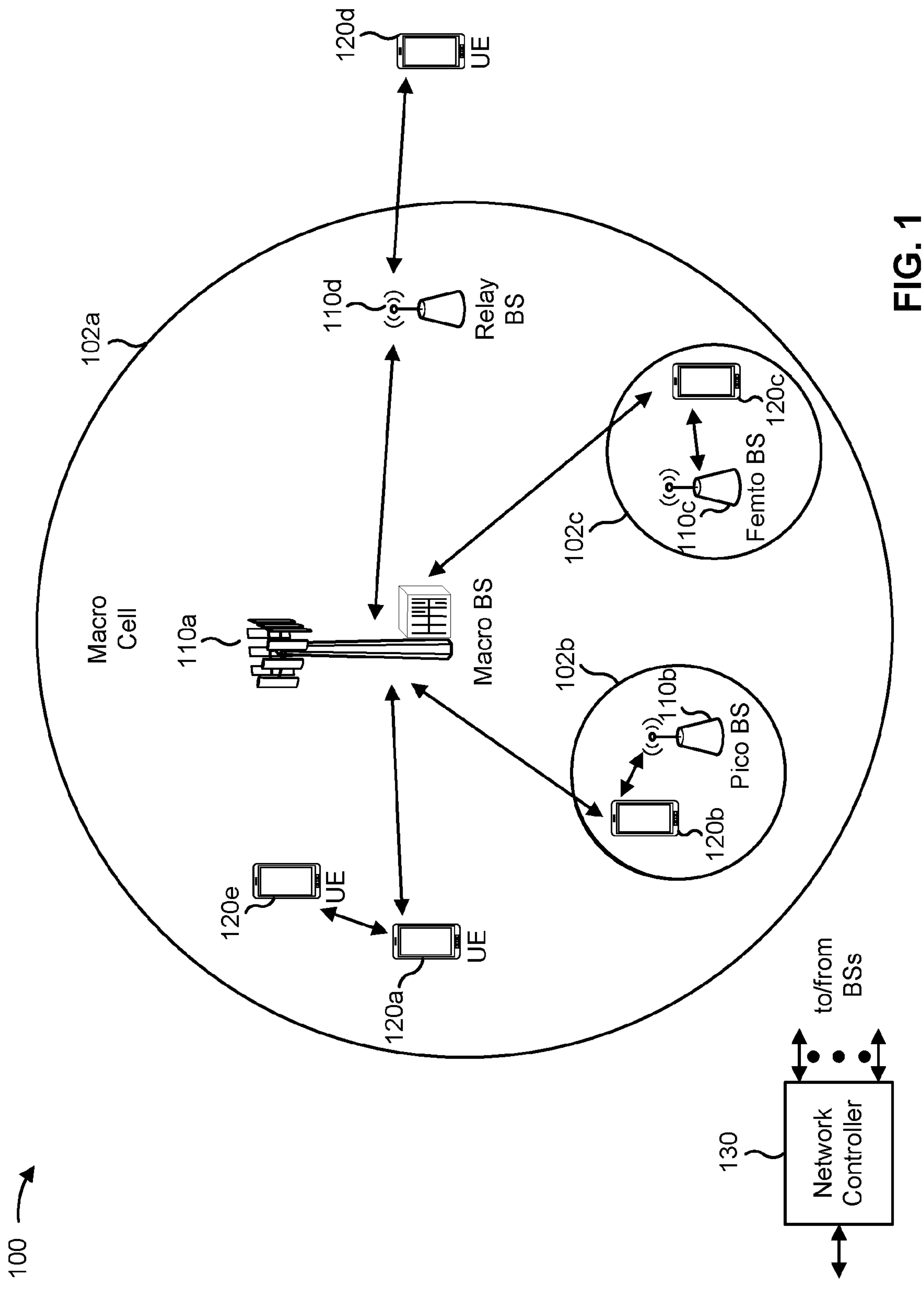
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
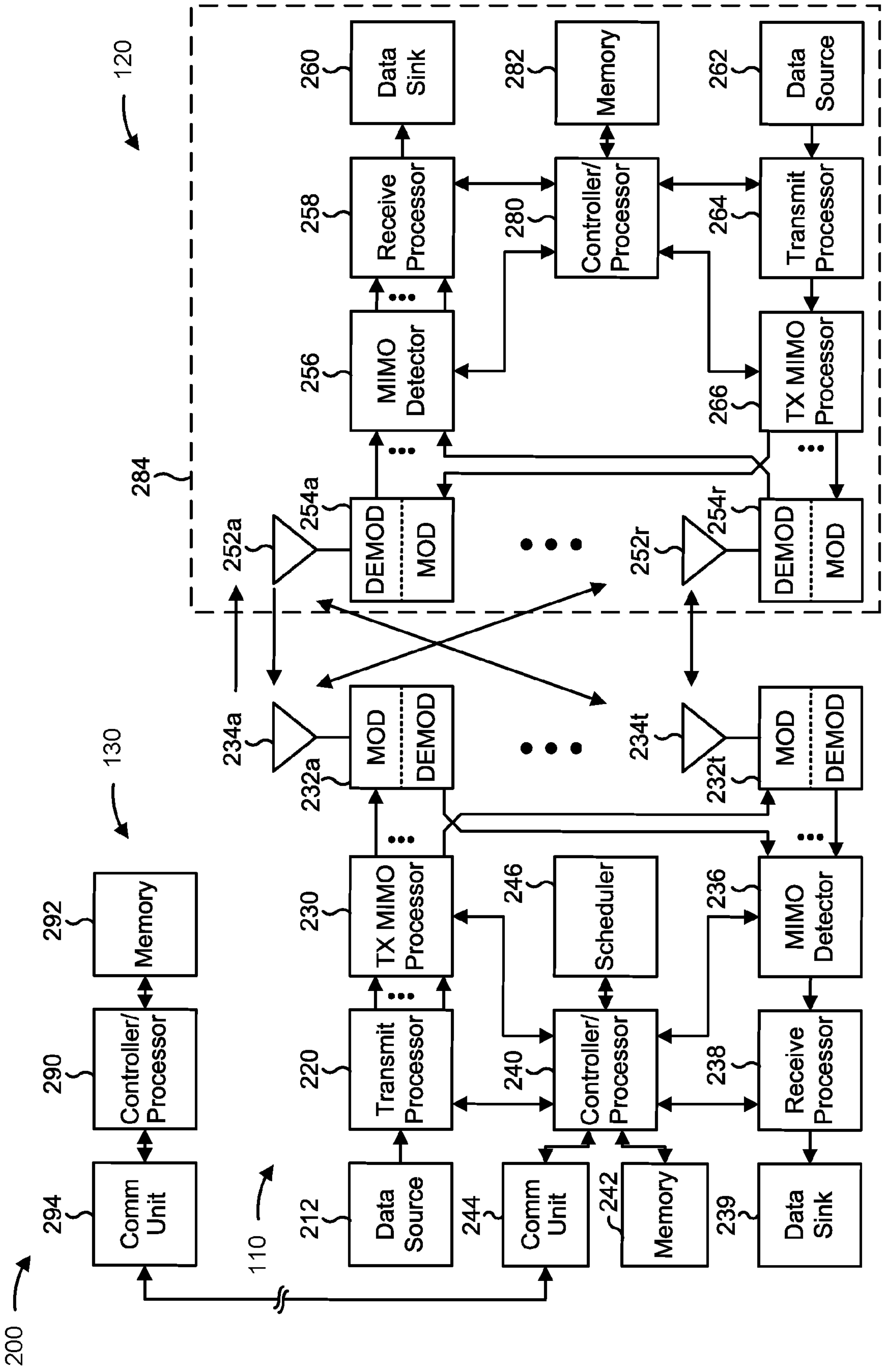
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 1-14).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 1-14).

Controller/processor 240 of base station 110, controller/processor 280 of UE 120, and/or any other component(s) of FIG. 2 may perform one or more techniques associated with linking reporting occasions of channel state information (CSI) report settings for reporting CSI for non-coherent joint transmission (NCJT), as described in more detail elsewhere herein. Reporting CSI for NCJT may be referred to as "NCJT CSI" and this process may also be referred to as "multi-TRP or mTRP CSI" or multiple transmission control indicator "(multi-TCI) state CSI". For example, controller/processor 240 of base station 110, controller/processor 280 of UE 120, and/or any other component(s) of FIG. 2 may perform or direct operations of, for example, process 1100 of FIG. 11, process 1200 of FIG. 12, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1100 of FIG. 11, process 1200 of FIG. 12, and/or other processes as described herein. In some aspects, executing instructions may include running the instructions, converting the instructions, compiling the instructions, and/or interpreting the instructions, among other examples.

In some aspects, the UE 120 includes means for jointly measuring CSI resources corresponding to a first reporting occasion of a first CSI report setting and a second reporting occasion of a second CSI report setting if the first reporting occasion is linked to the second reporting occasion based at least in part on a slot position of the first reporting occasion relative to a slot position of the second reporting occasion, where the first CSI report setting is associated with the second CSI report setting for NCJT CSI (e.g., using antenna 252, DEMOD 254, MIMO detector 256, receive processor 258, controller/processor 280, and/or memory 282), and/or means for transmitting, based at least in part on the measuring, a first report for the first CSI report setting at the first reporting occasion and a second report for the second CSI report setting at the second reporting occasion (e.g., using controller/processor 280, transmit processor 264, TX MIMO processor 266, MOD 254, antenna 252, and/or memory 282).

In some aspects, the UE 120 includes means for receiving an activation indication that activates one or more of a first semi-persistent (SP) CSI report setting or a second SP CSI report setting (e.g., using antenna 252, DEMOD 254, MIMO detector 256, receive processor 258, controller/processor 280, and/or memory 282), means for jointly measuring CSI resources corresponding to a first reporting occasion of the first CSI report setting and a second reporting occasion of the second CSI report setting if the first CSI report setting and the second CSI report setting are both activated and associated with each other for reporting CSI associated with non-coherent joint transmission (e.g., using antenna 252, DEMOD 254, MIMO detector 256, receive processor 258, controller/processor 280, and/or memory 282), and/or means for transmitting, based at least in part on the measuring, a first report for the first report setting at the first reporting occasion and a second report for the second report setting at the second reporting occasion (e.g., using controller/processor 280, transmit processor 264, TX MIMO processor 266, MOD 254, antenna 252, and/or memory 282).

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
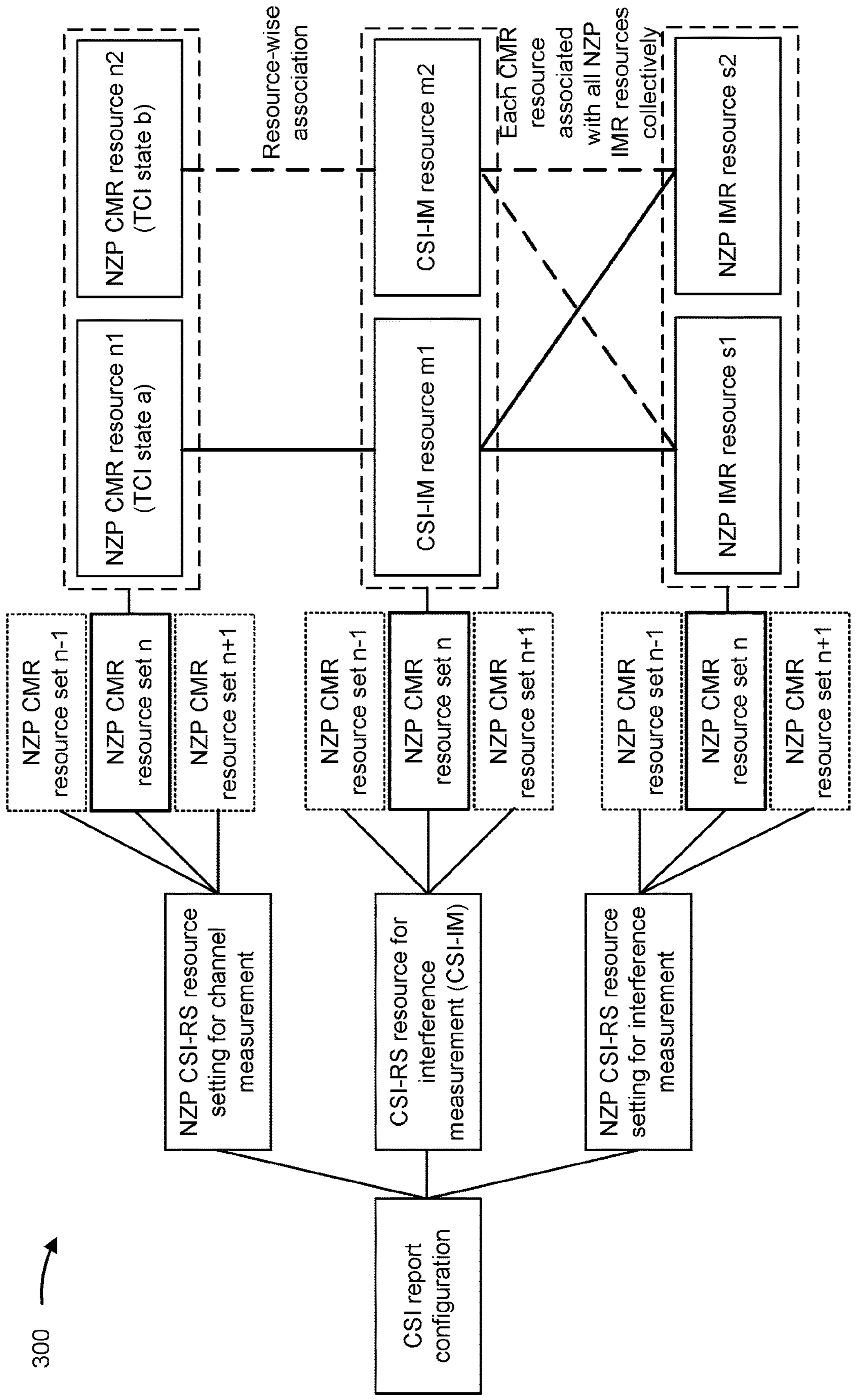
FIG. 3 is a diagram illustrating an example of a channel state information (CSI) report configuration, in accordance with the present disclosure.

FIG. 3 is a diagram illustrating an example 300 of a CSI report configuration, in accordance with the present disclosure.

Example 300 shows a CSI report configuration, which may include a CSI resource setting for a channel measurement resource (CMR), a CSI resource setting for CMR and CSI interference measurement (CSI-IM) or non-zero power (NZP) interference measurement resource (IMR), and a CSI resource setting for CMR and CSI-IM and NZP-IMR. Each resource setting may have one active resource set, and each resource set may have one or more resources (N resources). A UE may evaluate CSI corresponding to the NNZP CMR resources and select 1 CMR resource out of N resources. The UE may report a CSI reference signal (CSI-RS) resource indicator (CRI) as part of CSI feedback. The base station (e.g., gNB) may need to determine a reported CSI that corresponds to a NZP CMR resource. The CSI report configuration may also be referred to as a "CSI report setting." As described herein, a first CSI report setting may be associated with a second CSI report setting for linking reporting occasions in slots for transmission of CSI reports.

As indicated above, FIG. 3 is provided as an example. Other examples may differ from what is described with regard to FIG. 3.

Figure 4:
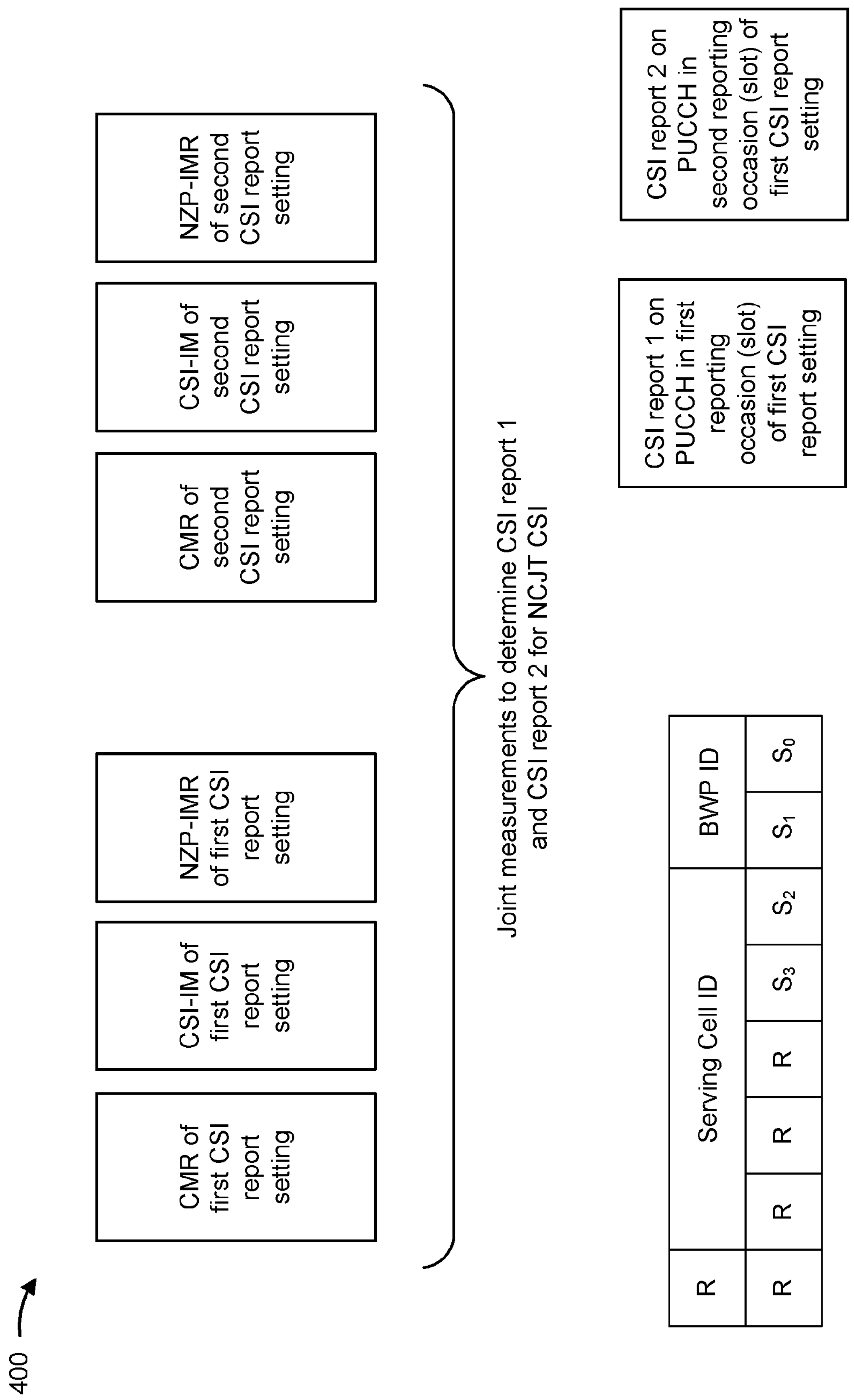
FIG. 4 is a diagram illustrating an example of CSI reporting for non-coherent joint transmission (NCJT) CSI, in accordance with the present disclosure.

FIG. 4 is a diagram illustrating an example 400 of NCJT CSI, in accordance with the present disclosure.

NCJT CSI (mTRP CSI or multi-TCI state CSI) may correspond to a CSI report associated with more than one TCI state. In such a case, NCJT is non-coherent in the sense that there is no single joint precoding across the TCI states, but rather each TCI state is associated with its own, possibly different, precoding There are at least two approaches for providing CSI reports. In a first approach, within one CSI report setting, two CSI-RS resources for channel measurement (two CMRs) are linked and an NCJT/mTRP CSI hypothesis corresponds to the pair of CMRs. One CSI report includes two precoding matrix indicators (PMIs) or two rank indicators (RIs) corresponding to two TRPs.

In a second approach that is more relevant to aspects of this disclosure, two CSI report settings are linked or associated with each other, and CMRs in different CSI report settings correspond to different TRPs. In such a case, NCJT is non-coherent in the sense that there is no single joint precoding across TRPs, but rather each TRP is associated with its own, possibly different, precoding. A UE can be configured with one or more NCJT CSI hypotheses to evaluate and report the CSI based on one of the hypotheses. An NCJT CSI hypothesis corresponds to a pair of CMRs (two CMRs that are associated with each other). In this context, the two CMRs belong to two different CSI report settings. An NCJT/mTRP CSI hypothesis may correspond to one CMR in a first CSI report setting and another CMR in a second CSI report setting. Example 400 shows a CMR, a CSI-IM, and an NZP-IMR for the first CSI report setting and a CMR, a CSI-IM, and an NZP-IMR for the second CSI report setting. The UE may jointly measure all of these resources for both the first CSI report setting and the second CSI report setting and generate a first CSI report 1 for the first CSI report setting (based on resources for both CSI report settings) and generate a second CSI report 2 for the second CSI report setting (also based on resources for both CSI report settings). The UE may transmit the CSI report 1 on a physical uplink control channel (PUCCH) in a slot that is a first reporting occasion of the first CSI report setting. The UE may transmit the CSI report 2 on another PUCCH in a slot that is a second reporting occasion for the second CSI report setting. A CSI report corresponding to a TRP/CSI report setting may contain relevant information for scheduling communications on a physical downlink shared channel (PDSCH).

For both periodic and SP CSI reports, a CSI report setting may specify how often and in which resources a CSI report is to be transmitted on the PUCCH. The CSI report setting may include a PUCCH resource identifier (ID). The CSI report setting may also include a periodicity and an offset, in order to specify in which slot (reporting occasion) to transmit a CSI report. The periodicity ($T_{CSI}$) may be measured in slots, and the slot offset ($T_{offset}$) may be configured as a quantity of slots. The UE may transmit a CSI report in frames with a system frame number $n_f$ and a slot number within the frame $$n^{\mu}_{sf},$$

satisfying $$\left(N_{slot}^{frame,\mu_{nf}} n_f + n^{\mu}_{s,f} - T_{offset}\right) \bmod T_{CSI} = 0,$$

with a subcarrier spacing (SCS) configuration μ, and $$N_{slot}^{frame,\mu}$$

represents a number of slots in a frame according to the SCS configuration μ.

For an SP CSI report, an activation indication, such as a medium access control control element (MAC-CE), may activate or deactivate one or more CSI report settings. A MAC-CE may activate up to 4 CSI report settings per bandwidth part (BWP) per component carrier (CC). Example 400 shows an example configuration of a MAC-CE. A 0 bit for $S_i$ (i=0, 1, 2, 3) means deactivation and a 1 bit means activation. The UE may perform SP CSI reporting on the PUCCH starting from the first slot that is 3 milliseconds (ms) after a hybrid automatic repeat request (HARQ) acknowledgement (ACK) corresponding to the PDSCH carrying the activation indication (MAC-CE).

As indicated above, FIG. 4 is provided as an example. Other examples may differ from what is described with regard to FIG. 4.

Figure 5:
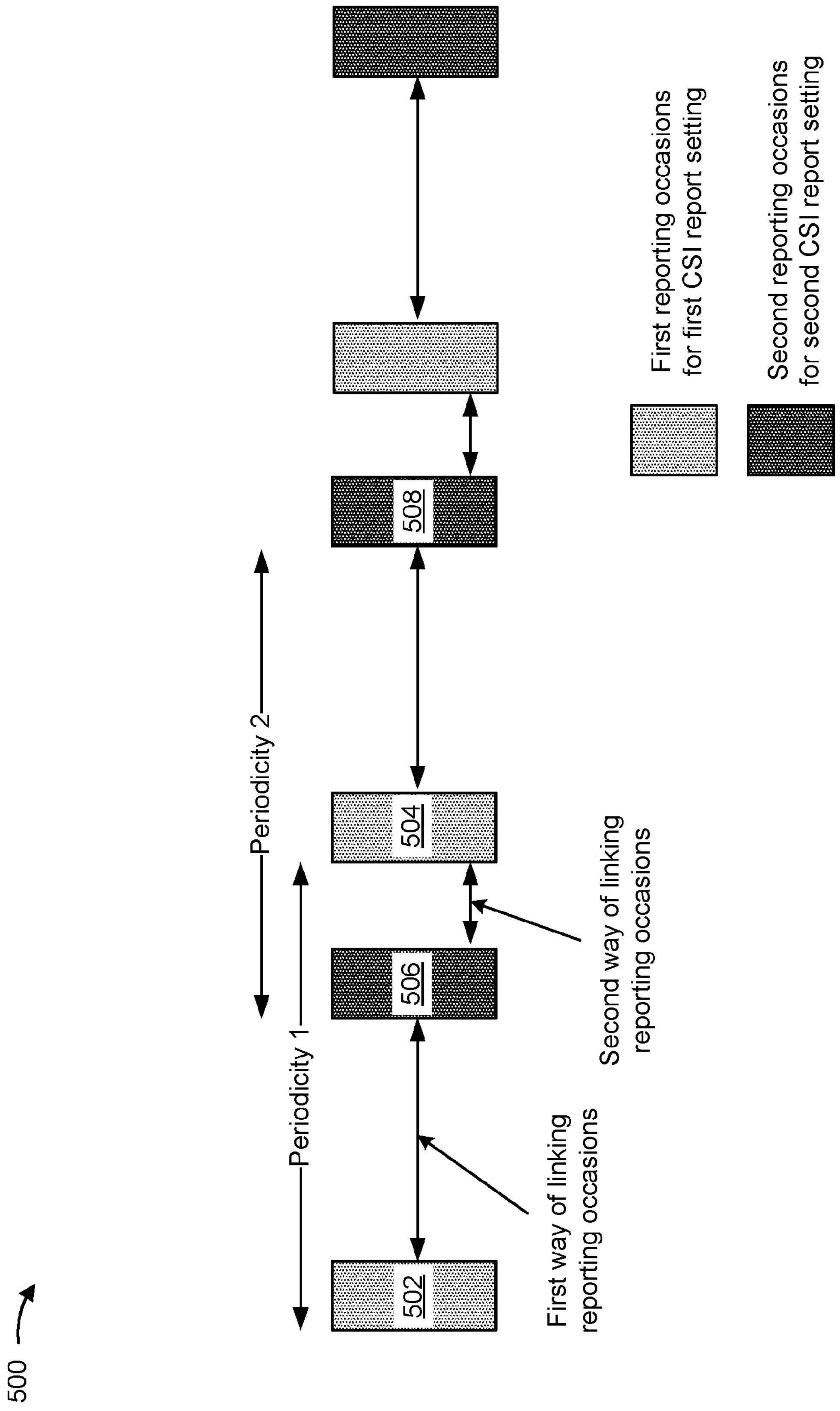
FIG. 5 is a diagram illustrating an example of reporting occasions, in accordance with the present disclosure.

FIG. 5 is a diagram illustrating an example 500 of reporting occasions, in accordance with the present disclosure. Example 500 shows first reporting occasions 502 and 504 of a first CSI report setting and second reporting occasions 506 and 508 of a second CSI report setting.

For NCJT CSI, two CSI report settings may be associated (linked) with each other. However, the UE is not able to determine which reporting occasions of the two CSI report settings are linked to each other. For example, a first way of linking reporting occasions include linking the first reporting occasion 502 with the second reporting occasion 506, and a second way of linking reporting occasions may include linking the second reporting occasion 506 with the next first reporting occasion 504. Furthermore, for SP CSI report settings, the UE does not know how to associate two CSI report settings.

As indicated above, FIG. 5 is provided as an example. Other examples may differ from what is described with regard to FIG. 5.

Figure 6:
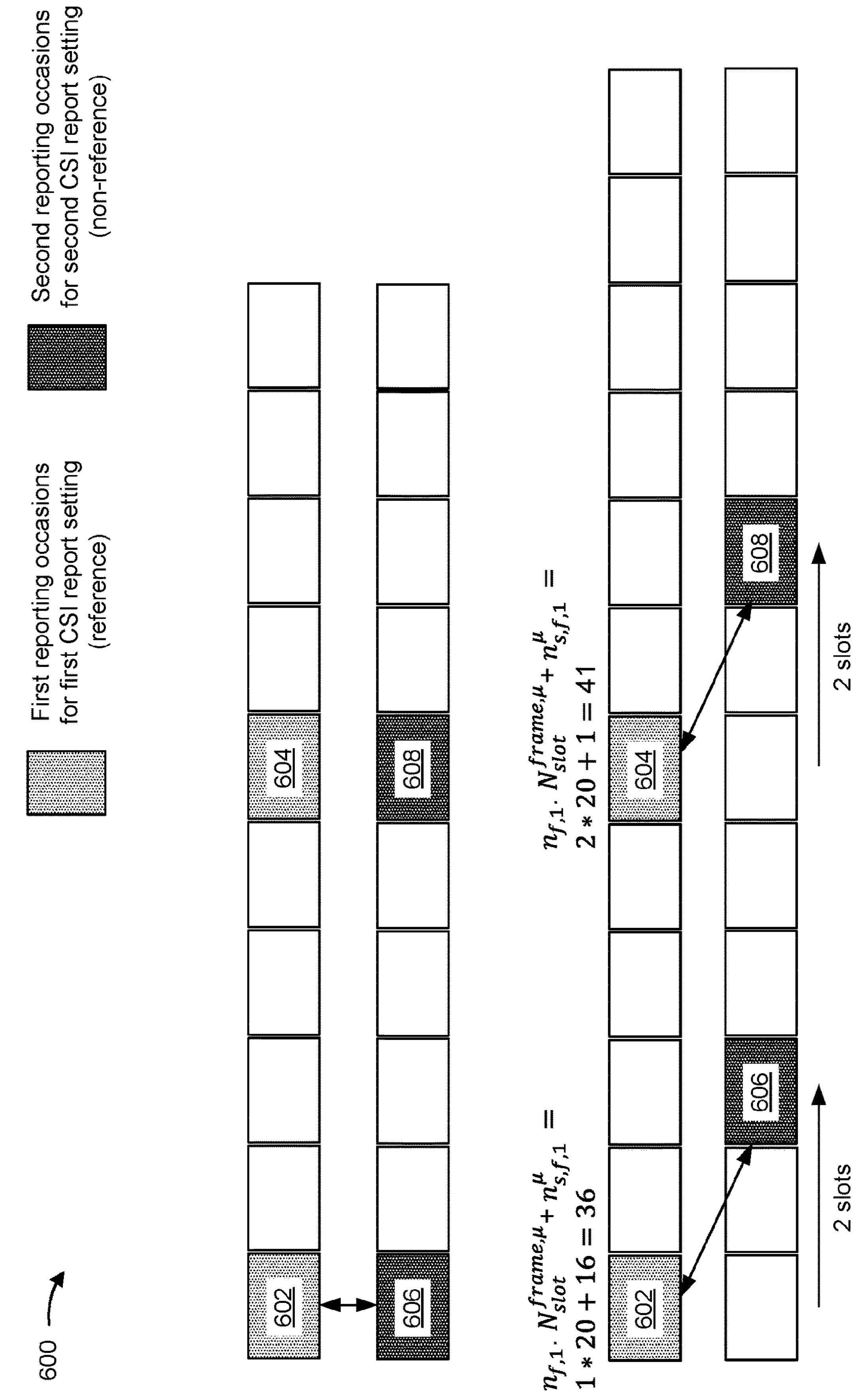
FIG. 6 is a diagram illustrating an example of linking reporting occasions of CSI report settings for NCJT CSI, in accordance with the present disclosure.

FIG. 6 is a diagram illustrating an example 600 of linking reporting occasions of CSI report settings for NCJT CSI, in accordance with the present disclosure.

Example 600 shows first reporting occasions 602 and 604 for a first CSI report setting and second reporting occasions 606 and 608 for a second CSI report setting. The first CSI report setting may be associated with the second CSI report setting (and the periodicities may be the same). That is, measurements of both CSI resource settings associated with corresponding CSI report settings are used to derive a first CSI report for the first CSI report setting and a second CSI report for the second CSI report setting. A UE may transmit the first CSI report in a first reporting occasion 602, which may be a specified slot for the PUCCH transmission. The UE may transmit the second CSI report in a second reporting occasion 606, which may be another specified slot.

The UE may jointly measure CSI resources corresponding to a first reporting occasion of the first CSI report setting and a second reporting occasion of the second CSI report setting for reporting CSI associated with NCJT CSI, if the first reporting occasion is linked to the second reporting occasion. According to various aspects described herein, the UE may determine that the first reporting occasion is linked to the second reporting occasion based at least in part on a slot position of the first reporting occasion relative to a slot position of the second reporting occasion. For example, the slot positions may align in the same slot or by a specified offset. In some aspects, the UE may use a formula to determine if slot positions of reporting occasions are linked. As a result, the UE may obtain more accurate joint CSI measurements when multiple TRPs are involved. This may improve communications and cause the UE to conserve power, processing resources, and signaling resources that would otherwise be consumed by degraded communications from less accurate joint CSI measurements.

For example, the first CSI report setting and the second CSI report setting may be configured with the same periodicity (in terms of number of slots). The first CSI report setting and the second CSI report setting may also be configured with a same slot offset. If so, the UE may determine that the first reporting occasion 602 is linked to the second reporting occasion 606 based at least in part on being transmitted in the same slot.

In some aspects, the first reporting occasion 602 or the first reporting occasion 604 may be a reference for the other (non-reference) reporting occasion, and the non-reference reporting occasion may be transmitted at an offset from the reference reporting occasion. The reporting occasion that is the reference may be the first reporting occasion in a pair that has a property of ordering among the first CSI report setting and the second CSI report setting. The reporting occasion that is the reference may also be determined by a rule, such as the reporting occasion of the CSI report setting with a lower 1D or a higher ID (after comparing the IDs). In example 600, the first reporting occasion 602 may be the reference and the second reporting occasion 606 may be linked to the first reporting occasion 602 by being in a slot at a configured offset (e.g., 2 slots). That is, by nature of the configured offset, the first reporting occasion 602 may indicate the slot in which the linked reporting occasion is to be found.

In some aspects, the UE may determine a linked non-reference reporting occasion, with respect to a reference reporting occasion, using a formula, such as $$n_{f,1} * N_{slot}^{frame,\mu} + n_{s,f,1}^{\mu}.$$

Example 600 shows use of the formula if $T_{offset,1}$ for the first CSI report setting is 1, if the $T_{offset,2}$ for the second CSI report setting is 2, and if the periodicity $T_{CSI}$ is 5 and the SCS for transmission is 30 kilohertz (kHz), such that $$N_{slot}^{frame,\mu} = 20.$$

The formula in example 600 renders 36 for the first reporting occasion 602, and there may be an offset of 2 for the linked second reporting occasion 606. Likewise, the formula for the first reporting occasion 604 renders 41, and there may be an offset of 2 for the linked second reporting occasion 608.

By using properties of associated CSI report settings, the UE may determine which reporting occasions are to be linked for reporting CSI for NCJT CSI.

As indicated above, FIG. 6 is provided as an example. Other examples may differ from what is described with regard to FIG. 6.

Figure 7:
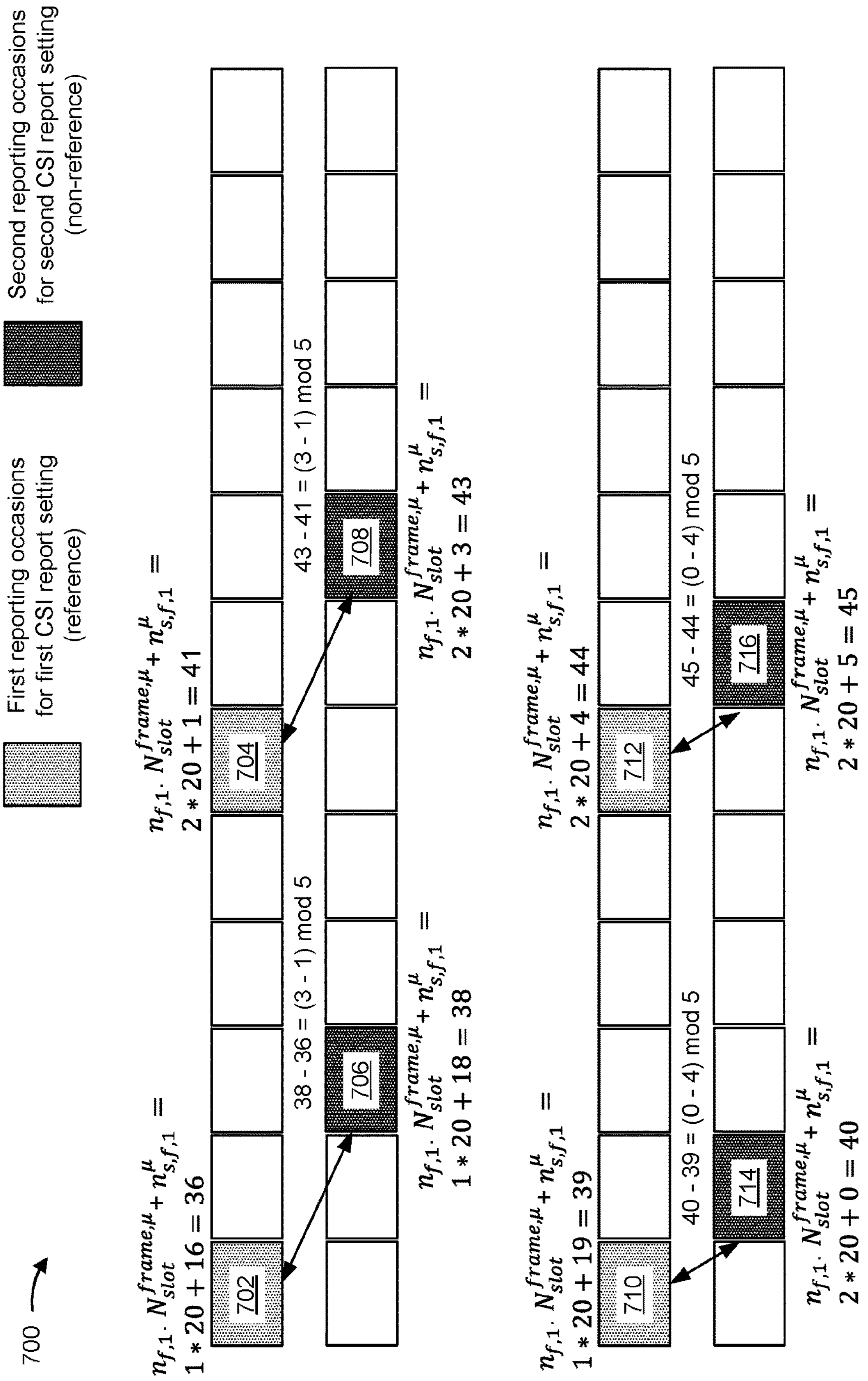
FIG. 7 is a diagram illustrating an example of linking reporting occasions of CSI report settings for NCJT CSI, in accordance with the present disclosure.

FIG. 7 is a diagram illustrating an example 700 of linking reporting occasions of CSI report settings for NCJT CSI, in accordance with the present disclosure. Example 700 shows first reporting occasions 702 and 704 for a first CSI report setting and second reporting occasions 706 and 708 for a second CSI report setting. Example 700 also shows first reporting occasions 710 and 712 for the first CSI report setting (reference) and second reporting occasions 714 and 716 for the second CSI report setting (non-reference), but with different offsets for the first CSI report setting and the second CSI report setting. The periodicities of the first CSI report setting and the second CSI report setting may be the same.

In some aspects, two reporting occasions in slots X and Y for two CSI report settings are linked if $Y-X=(T_{offset,2}-T_{offset,1}) \bmod T_{CSI}$, where X and $T_{offset,1}$ are for the first CSI report setting and Y and $T_{offset,2}$ are for the second CSI report setting. Example 700 shows how first reporting occasion 702 is linked with second reporting occasion 706 by way of the formula $$n_{f,1} * N_{slot}^{frame,\mu} + n_{s,f,1}^{\mu}$$

and a linking formula $Y-X=(T_{offset,2}-T_{offset,1}) \bmod T_{CSI}$. If the formula renders 36 for the slot of first reporting occasion 702 and 38 for the slot of second reporting occasion 706, then, for the linking formula, 38-36=2, which equals (3-1) mod 5 if $T_{offset,1}=1$ and $T_{offset,2}=3$ for a periodicity $T_{CSI}$ of 5 slots. Accordingly, the first reporting occasion 702 and the second reporting occasion 706 are linked for CSI reporting for NCJT CSI. The UE may jointly measure CSI resources of the first reporting occasion 702 and the second reporting occasion 706 to generate a first CSI report for the first CSI report setting and a second CSI report for the second CSI report setting. The UE may transmit the first CSI report in the slot of the first reporting occasion 702 and the second CSI report in the slot of the second reporting occasion 706. The formula may be applied to determine that the first reporting occasion 704 (formula for slot renders 41) and the second reporting occasion 708 are linked (formula for slot renders 43), because 43-41=2=(3-1) mod 5.

Example 700 also shows that if the offsets for the CSI report settings change to $T_{offset,1}=4$ and $T_{offset,2}=0$, the UE may determine that first reporting occasion 710 (formula for slot renders 39) and second reporting occasion 714 (formula for slot renders 40) are linked, because 40−39=1=(0-4) mod 5. The UE may determine that first reporting occasion 712 (formula for slot renders 44) and second reporting occasion 716 (formula for slot renders 45) are linked, because 45−44=1=(0-4) mod 5.

In some aspects, the UE may determine that reporting occasions in slot X and slot Y are linked if a difference of a quantity of slots between slot X and slot Y (|X−Y|) satisfies a distance threshold (e.g., less than or equal to a maximum distance). The distance threshold may be periodicity $T_{CSI}/2$. For example, if first reporting occasions for the first CSI report setting are in slots 1, 6, 11, and 16, and the second reporting occasions for the second CSI report setting are in slots 3, 8, 13, and 18, linked reporting occasions that fall within a distance threshold of 2 slots are reporting occasions in slots: {1, 3}, {6, 8}, {11, 13}, and {16, 18}. If first reporting occasions for the first CSI report setting are in slots 1, 6, 11, and 16, and the second reporting occasions for the second CSI report setting are in slots 4, 9, 14, and 19, linked reporting occasions that fall within the distance threshold of 2 slots are reporting occasions in slots: {4, 6}, {9, 11}, and {14, 16}.

In some aspects, the UE may determine that reporting occasions are linked by linking a reporting occasion of the first CSI report setting, with a most recent reporting occasion of the second CSI report setting. This may introduce a scenario where one reporting occasion is linked with two other reporting occasions. For example, if first reporting occasions for the first CSI report setting are in slots 1, 6, 11, and 16, and the second reporting occasions for the second CSI report setting are in slots 3, 8, 13, and 18, the reporting occasions that are linked may be in slots: {1, 3}, {3, 6}, {6, 8}, {8, 11}, and so forth. The UE may calculate an NCJT hypothesis by treating the previous reporting occasion as indicating interference. For example, for linked reporting occasions in slots {1, 3}, the PMI may be determined based at least in part on slot 3 while slot 1 is assumed to be interference. Then, for {3, 6}, the PMI may be determined based at least in part on slot 6 while treating slot 3 as interference (either without precoding or based at least in part on PMI determined as part of {1, 3} NCJT CSI.

As indicated above, FIG. 7 is provided as an example. Other examples may differ from what is described with regard to FIG. 7.

Figure 8:
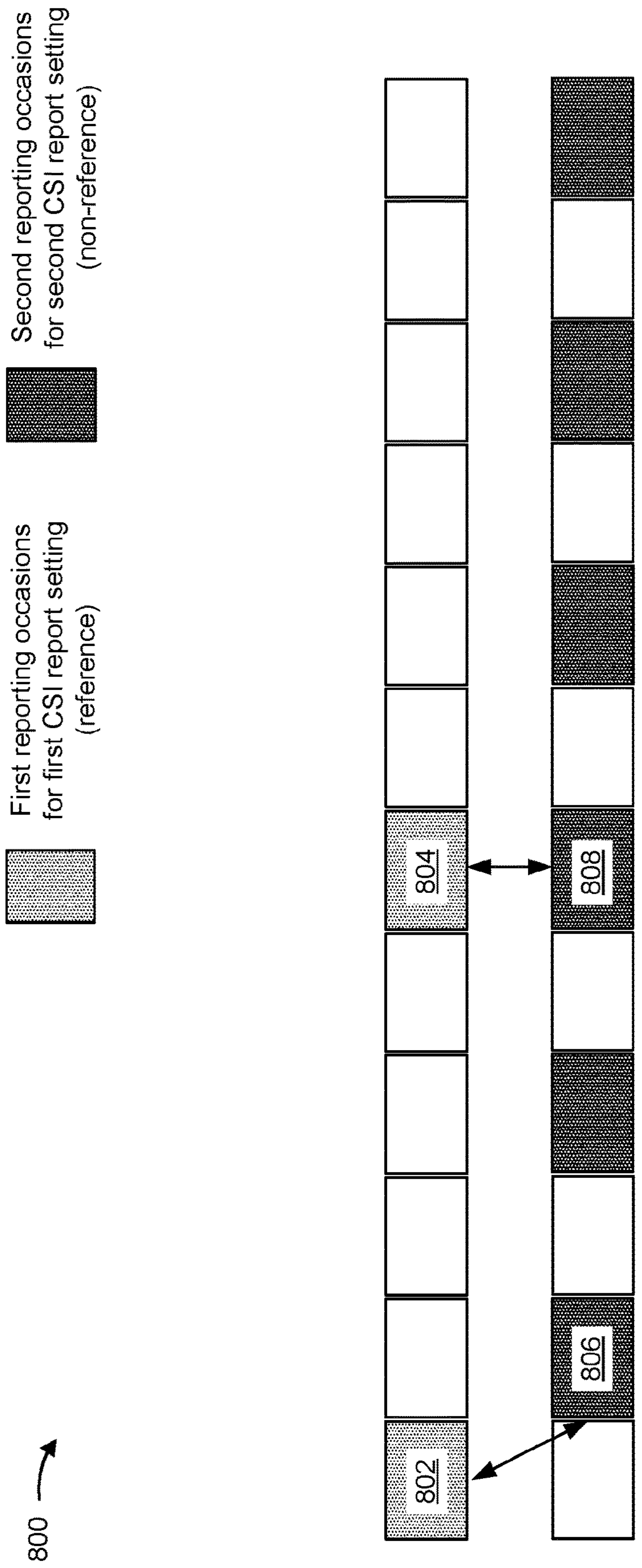
FIG. 8 is a diagram illustrating an example of linking reporting occasions of CSI report settings with different periodicities, in accordance with the present disclosure.

FIG. 8 is a diagram illustrating an example 800 of linking reporting occasions of CSI report settings with different periodicities, in accordance with the present disclosure. Example 800 shows first reporting occasions 802 and 804 for a first CSI report setting and second reporting occasions 806 and 808 for a second CSI report setting. The first CSI report setting may have a periodicity of 5 slots, and the second CSI report setting may have a periodicity of 2 slots.

In some aspects, the first CSI report setting and the second CSI report setting may have different periodicities. In this scenario, some reporting occasions may be linked while other reporting occasions are not. The UE may receive a radio resource control (RRC) message indicating which reporting occasions are linked. The UE may also use a rule to determine which reporting occasions are linked. For example, the rule may specify that reporting occasions are linked if they are in the same slot, offset by a specified quantity of slots, in adjacent slots, or within a threshold quantity of slots. Example 800 shows that, according to one rule, the first reporting occasion 802 is linked to the second reporting occasion 806 if the first reporting occasion 802 and the second reporting occasion 806 are in adjacent slots. Example 800 also shows that, according to another rule, the first reporting occasion 804 is linked to the second reporting occasion 808 if the first reporting occasion 804 and the second reporting occasion 808 are in a same slot. If reporting occasions are not linked, reported CSI may not be based on joint measurements. That is, the reported CSI may be based on channel or interference measurements associated only with that CSI report setting and not on the channel or interference measurements associated with the associated CSI report setting.

As indicated above, FIG. 8 is provided as an example. Other examples may differ from what is described with regard to FIG. 8.

Figure 9:
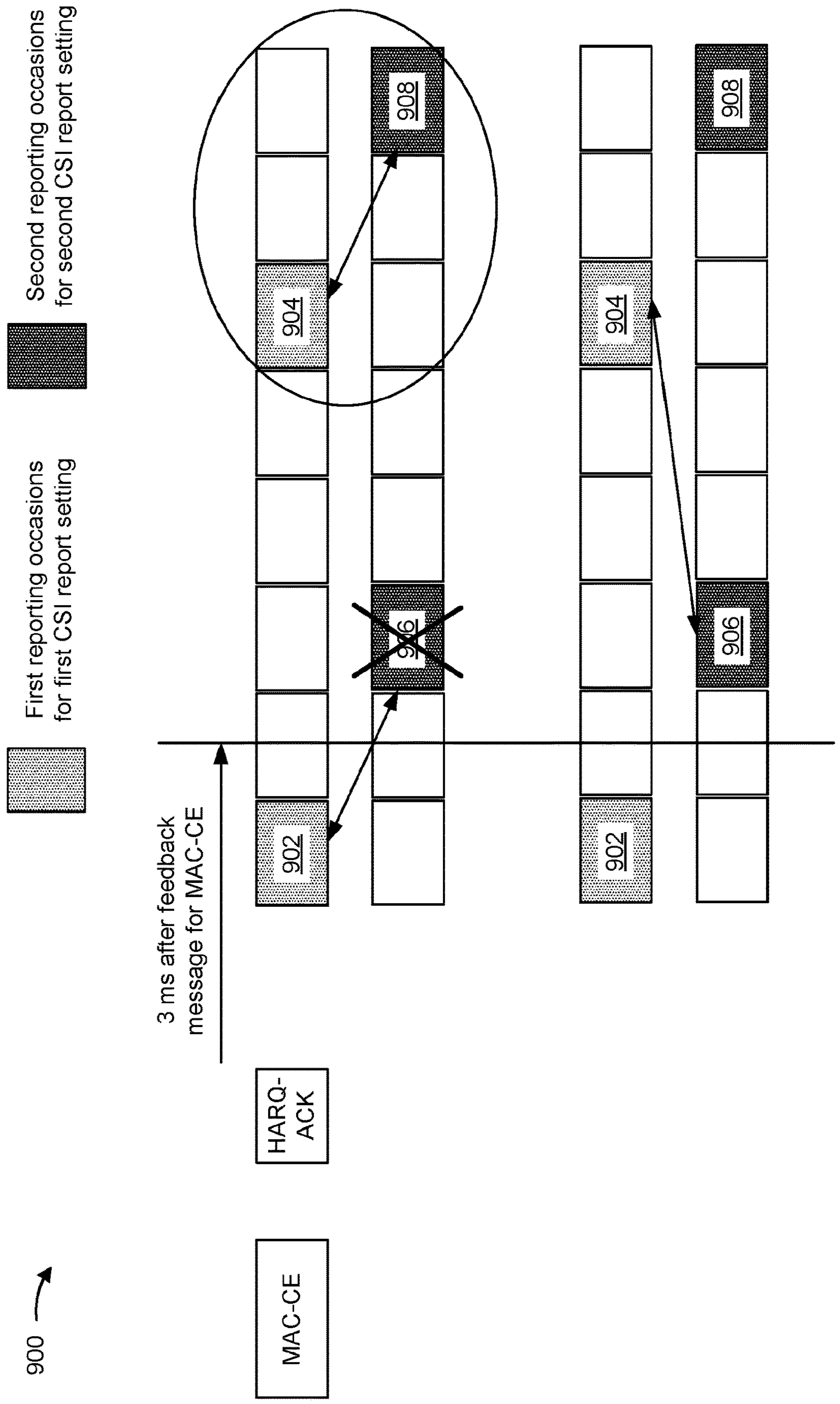
FIG. 9 is a diagram illustrating an example of linking reporting occasions, in accordance with the present disclosure.

FIG. 9 is a diagram illustrating an example 900 of linking reporting occasions, in accordance with the present disclosure. Example 900 shows first reporting occasions 902 and 904 for a first CSI report setting and second reporting occasions 906 and 908 for a second CSI report setting.

The first CSI report setting and the second CSI report setting may be associated with each other. The first CSI report setting and the second CSI report setting may be associated through RRC configuration. While the first CSI report setting and the second CSI report setting may be associated, the UE may not be aware of the association or aware of which CSI report settings are activated for joint measurements and CSI reporting for NCJT CSI. According to various aspects described herein, the UE may receive an activation indication via a MAC-CE, an RRC message, or downlink control information (DCI).

Example 900 shows an activation indication in a MAC-CE, such as shown in FIG. 4. In some aspects, the activation indication (e.g., MAC-CE) may activate or deactivate both the first CSI report setting and the second CSI report setting. In some aspects, the activation indication may indicate that the first CSI report setting is associated with the second CSI report setting. If only one CSI report setting is activated, the other CSI report setting is ignored and CSI is reported based on channel and/or interference measurements associated with the active CSI report setting. In some aspects, the activation indication may activate only one CSI report setting, but by nature of the association with the other CSI report setting, the other CSI report setting may also be activated.

When two or more SP CSI report settings are activated by the activation indication, the activation indication may indicate whether one or more pairs of CSI report settings are linked for NCJT CSI or if CSI report settings are activated individually (but simultaneously in one activation indication). For example, one or more bits of a MAC-CE, which may be different than one or more bits corresponding to the actual activation, may indicate that CSI report settings are associated with each other. The bits may include one or more reserve bits that indicate that activated CSI report settings are associated with each other. The CSI report setting may not have been associated via an RRC configuration.

In some aspects, the UE may link reporting occasions based at least in part on the activation indication. Example 900 shows that there is a point in the timeline 3 ms after a feedback message (e.g., HARQ-ACK) for the activation indication (e.g., MAC-CE) is transmitted. This 3 ms provides an activation time. The UE may link two reporting occasions after the activation is applied (after the activation time). Accordingly, if the first CSI report setting is a reference and the first reporting occasions 902 and 904 are references, the UE may link the first reference and non-reference reporting occasions after the activation time, which would be the first reporting occasion 904 and the second reporting occasion 908, and not the first reporting occasion 902 and the second reporting occasion 906, because the first reporting occasion 902 falls within the activation time.

In some aspects, the UE may treat the first reporting occasion after the activation time as the reference. For example, the second reporting occasion 906 is the first reporting occasion after the activation time. The next first reporting occasion after the activation time is the first reporting occasion 904. Accordingly, the UE links the second reporting occasion 906 and the first reporting occasion 904 for joint measurements for CSI reporting for NCJT CSI.

As indicated above, FIG. 9 is provided as an example. Other examples may differ from what is described with regard to FIG. 9.

Figure 10:
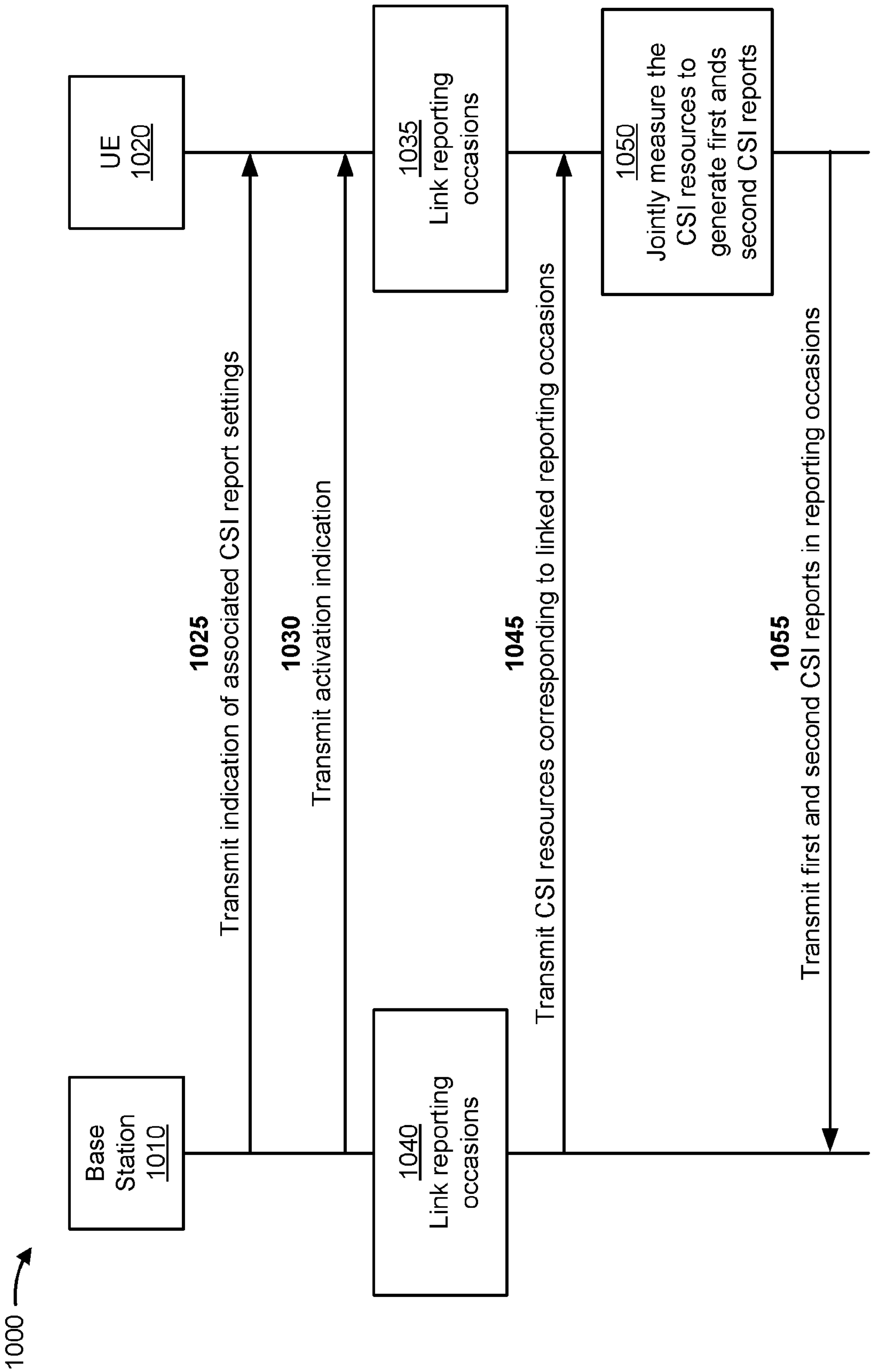
FIG. 10 is a diagram illustrating an example of linking reporting occasions, in accordance with the present disclosure.

FIG. 10 is a diagram illustrating an example 1000 of linking reporting occasions, in accordance with the present disclosure. As shown in FIG. 10, a base station 1010 (e.g., base station 110) may communicate with a UE 1020 (e.g., UE 120, UE 1020). The base station 1010 and the UE 1020 may be part of a wireless network (e.g., wireless network 100).

As shown by reference 1025, the base station 1010 may transmit an indication that a first CSI report setting is associated with a second CSI report setting. The indication may be in an RRC message. In some aspects, the base station 1010 may transmit an activation indication (e.g., MAC-CE), as shown by reference number 1030. The activation indication may activate one or more CSI report settings and may indicate if CSI report settings are associated with each other.

As shown by reference number 1035, the UE 1020 may link a first reporting occasion for the first CSI report and a second reporting occasion for the second CSI report. The UE 1020 may link the reporting occasions based at least in part on a slot position of the first reporting occasion relative to the slot position of the second reporting occasion. This may include linking reporting occasions in a same slot, linking reporting occasions offset by a specified quantity of slots, linking reporting occasions according to a formula or distance threshold, linking reporting occasions based at least in part on an activation time after the activation indication, and/or linking reporting occasions based at least in part on any other aspects described herein. As shown by reference number 1040, the base station 1010 may be aware of and use the same rules as the UE 1020 for linking reporting occasions and thus may also link reporting occasions. As shown by reference number 1045, the base station may transmit CSI resources for linked reporting occasions. As shown by reference number 1050, the UE 1020 may jointly measure the CSI resources for CSI reporting for NCJT CSI, and generate a first CSI report for the first CSI report setting and a second CSI report for the second CSI report setting. As shown by reference number 1055, the UE 1020 may transmit the first CSI report in the first reporting occasion of the first CSI report setting and the second CSI report in the second reporting occasion of the second CSI report setting. As a result of the UE 1020 linking the reporting occasions, the base station 1010 may receive CSI measurements that are more accurate than if the reporting occasions were not linked as described herein. The base station 1010 may make adjustments as necessary, based at least in part on the CSI measurements, and improve communications between the UE 1020 and the base station 1010 and other TRPs. Improved communications conserve processing resources and signaling resources.

As indicated above, FIG. 10 is provided as an example. Other examples may differ from what is described with regard to FIG. 10.

Figure 11:
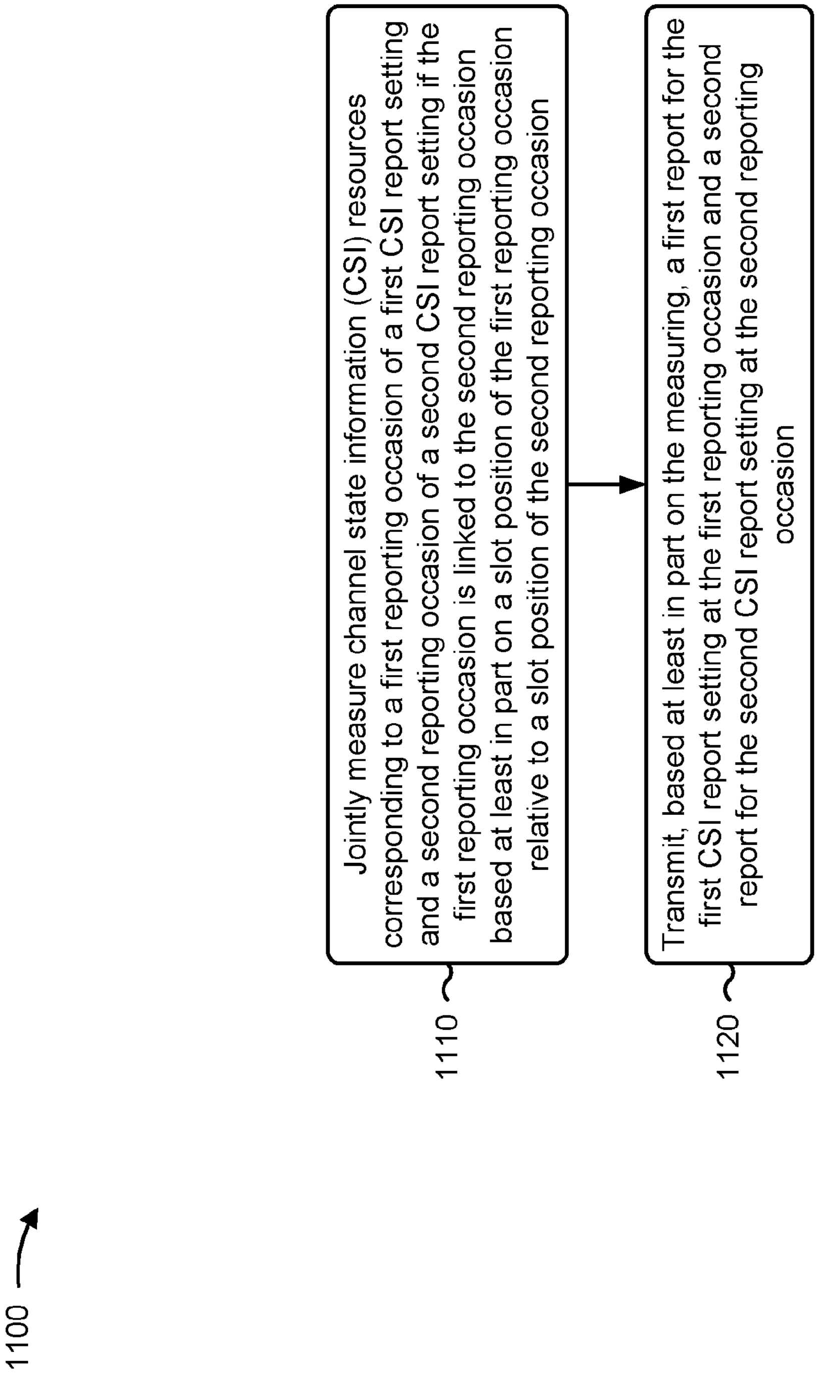
FIG. 11 is a diagram illustrating an example process performed, for example, by a UE, in accordance with the present disclosure.

FIG. 11 is a diagram illustrating an example process 1100 performed, for example, by a UE, in accordance with the present disclosure. Example process 1100 is an example where the UE (e.g., UE 120, UE 1020) performs operations associated with linking reporting occasions for NCJT CSI.

As shown in FIG. 11, in some aspects, process 1100 may include jointly measuring CSI resources corresponding to a first reporting occasion of a first CSI report setting and a second reporting occasion of a second CSI report setting if the first reporting occasion is linked to the second reporting occasion based at least in part on a slot position of the first reporting occasion relative to a slot position of the second reporting occasion (block 1110). For example, the UE (e.g., using measurement component 1308 depicted in FIG. 13) may jointly measure CSI resources corresponding to a first reporting occasion of a first CSI report setting and a second reporting occasion of a second CSI report setting if the first reporting occasion is linked to the second reporting occasion based at least in part on a slot position of the first reporting occasion relative to a slot position of the second reporting occasion, as described above, for example, with reference to FIGS. 3-10. In some aspects, the first CSI report setting is associated with the second CSI report setting for reporting CSI associated with non-coherent joint transmission.

As further shown in FIG. 11, in some aspects, process 1100 may include transmitting, based at least in part on the measuring, a first report for the first CSI report setting at the first reporting occasion and a second report for the second CSI report setting at the second reporting occasion (block 1120). For example, the UE (e.g., using transmission component 1304 depicted in FIG. 13) may transmit, based at least in part on the measuring, a first report for the first CSI report setting at the first reporting occasion and a second report for the second CSI report setting at the second reporting occasion, as described above, for example, with reference to FIGS. 3-10.

Process 1100 may include additional aspects, such as any single aspect or any combination of aspects described below and/or in connection with one or more other processes described elsewhere herein.

In a first aspect, the first CSI report setting has a same slot periodicity and a same slot offset as the second CSI report setting, and the first reporting occasion and the second reporting occasion are linked based at least in part on being transmitted in a same slot.

In a second aspect, alone or in combination with the first aspect, process 1100 includes selecting the first reporting occasion or the second reporting occasion as a reference slot that indicates, by an offset, a slot of the other one of the first reporting occasion or the second reporting occasion.

In a third aspect, alone or in combination with one or more of the first and second aspects, the first reporting occasion or the second reporting occasion is selected as the reference slot based at least in part on one or more of a configuration message that indicates one of the first CSI report setting or the second CSI report setting is a reference CSI report setting, or a result of comparing a first identifier for the first CSI report setting and a second identifier for the second CSI report setting.

In a fourth aspect, alone or in combination with one or more of the first through third aspects, the first reporting occasion and the second reporting occasion are linked if a difference of a quantity of slots from the first reporting occasion to the second reporting occasion equals a difference between an offset for a non-reference CSI report setting and an offset for a reference CSI report setting, after a modulo operation with a periodicity of the reference CSI report setting.

In a fifth aspect, alone or in combination with one or more of the first through fourth aspects, the first CSI report setting or the second CSI report setting is selected as the reference CSI report setting based at least in part on one or more of a configuration message that indicates one of the first CSI report setting or the second CSI report setting is the reference CSI report setting, or a result of comparing a first identifier for the first CSI report setting and a second identifier for the second CSI report setting.

In a sixth aspect, alone or in combination with one or more of the first through fifth aspects, the first reporting occasion and the second reporting occasion are linked if a difference of a quantity of slots from the first reporting occasion to the second reporting occasion satisfies a distance threshold.

In a seventh aspect, alone or in combination with one or more of the first through sixth aspects, the first CSI report setting has a same slot periodicity as the second CSI report setting, and the distance threshold is the slot periodicity divided by two.

In an eighth aspect, alone or in combination with one or more of the first through seventh aspects, the first reporting occasion and the second reporting occasion are linked if the second reporting occasion is a most recent reporting occasion of the second CSI report setting, with respect to the first reporting occasion.

In a ninth aspect, alone or in combination with one or more of the first through eighth aspects, a slot periodicity of the first CSI report setting is different than a slot periodicity of the second CSI report setting, and the first reporting occasion and the second reporting occasion are linked based at least in part on a configuration indicated in a radio resource control message or based at least in part on a rule for reporting occasions that share a same slot or are in adjacent slots.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
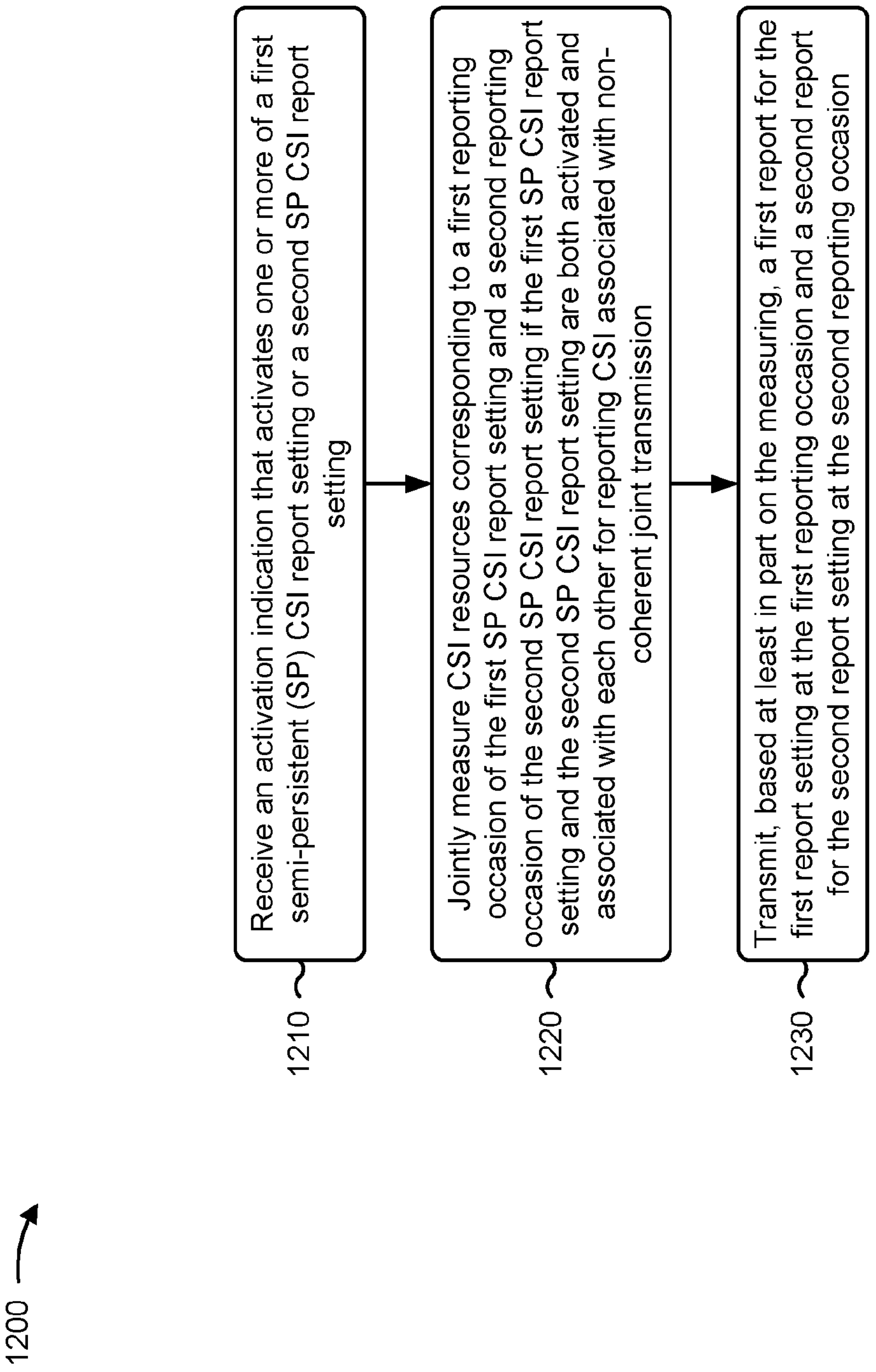
FIG. 12 is a diagram illustrating an example process performed, for example, by a UE, in accordance with the present disclosure.

FIG. 12 is a diagram illustrating an example process 1200 performed, for example, by a UE, in accordance with the present disclosure. Example process 1200 is an example where the UE (e.g., UE 120) performs operations associated with associating CSI report settings for NCJT CSI.

As shown in FIG. 12, in some aspects, process 1200 may include receiving an activation indication that activates one or more of a first SP CSI report setting or a second SP CSI report setting (block 1210). For example, the UE (e.g., using reception component 1402 depicted in FIG. 14) may receive an activation indication that activates one or more of a first SP CSI report setting or a second SP CSI report setting, as described above, for example, with reference to FIGS. 3-4 and/or 9-10.

As further shown in FIG. 12, in some aspects, process 1200 may include jointly measuring CSI resources corresponding to a first reporting occasion of the first SP CSI report setting and a second reporting occasion of the second SP CSI report setting if the first SP CSI report setting and the second SP CSI report setting are both activated and associated with each other for reporting CSI associated with non-coherent joint transmission (block 1220). For example, the UE (e.g., using measurement component 1408 depicted in FIG. 14) may jointly measure CSI resources corresponding to a first reporting occasion of the first SP CSI report setting and a second reporting occasion of the second SP CSI report setting if the first SP CSI report setting and the second SP CSI report setting are both activated and associated with each other for reporting CSI associated with non-coherent joint transmission, as described above, for example, with reference to FIGS. 3-4 and/or 9-10.

As further shown in FIG. 12, in some aspects, process 1200 may include transmitting, based at least in part on the measuring, a first report for the first report setting at the first reporting occasion and a second report for the second report setting at the second reporting occasion (block 1230). For example, the UE (e.g., using transmission component 1404 depicted in FIG. 14) may transmit, based at least in part on the measuring, a first report for the first report setting at the first reporting occasion and a second report for the second report setting at the second reporting occasion, as described above, for example, with reference to FIGS. 3-4 and/or 9-10.

Process 1200 may include additional aspects, such as any single aspect or any combination of aspects described below and/or in connection with one or more other processes described elsewhere herein.

In a first aspect, process 1200 includes receiving an RRC message indicating that the first SP CSI report setting is associated with the second SP CSI report setting, and the activation indication is in a MAC-CE and activates both the first SP CSI report setting and the second SP CSI report setting.

In a second aspect, alone or in combination with the first aspect, the activation indication indicates that the first SP CSI report setting is associated with the second SP CSI report setting, and the activation indication activates both the first SP CSI report setting and the second SP CSI report setting.

In a third aspect, alone or in combination with one or more of the first and second aspects, the first SP CSI report setting is associated with the second SP CSI report setting, and the first SP CSI report setting and the second SP CSI report setting are both activated based at least in part on the activation indication indicating that the first SP CSI report setting or the second SP CSI report setting is activated.

In a fourth aspect, alone or in combination with one or more of the first through third aspects, the activation indication is in a MAC-CE and activates two or more SP CSI report settings, and the MAC-CE includes an indication that the first SP CSI report setting is associated with the second SP CSI report setting.

In a fifth aspect, alone or in combination with one or more of the first through fourth aspects, the indication that the first SP CSI report setting is associated with the second SP CSI report setting includes one or more first bits in the MAC-CE different than one or more second bits in the MAC-CE corresponding to the activation indication.

In a sixth aspect, alone or in combination with one or more of the first through fifth aspects, the first reporting occasion and the second reporting occasion are a first two reporting occasions that are both a threshold time after a feedback message for the activation indication.

In a seventh aspect, alone or in combination with one or more of the first through sixth aspects, the first reporting occasion and the second reporting occasion are a first two reporting occasions that are both a threshold time after a feedback message for the activation indication, and an earlier of the first reporting occasion or the second reporting occasion is a reference for the other of the first reporting occasion or the second reporting occasion.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
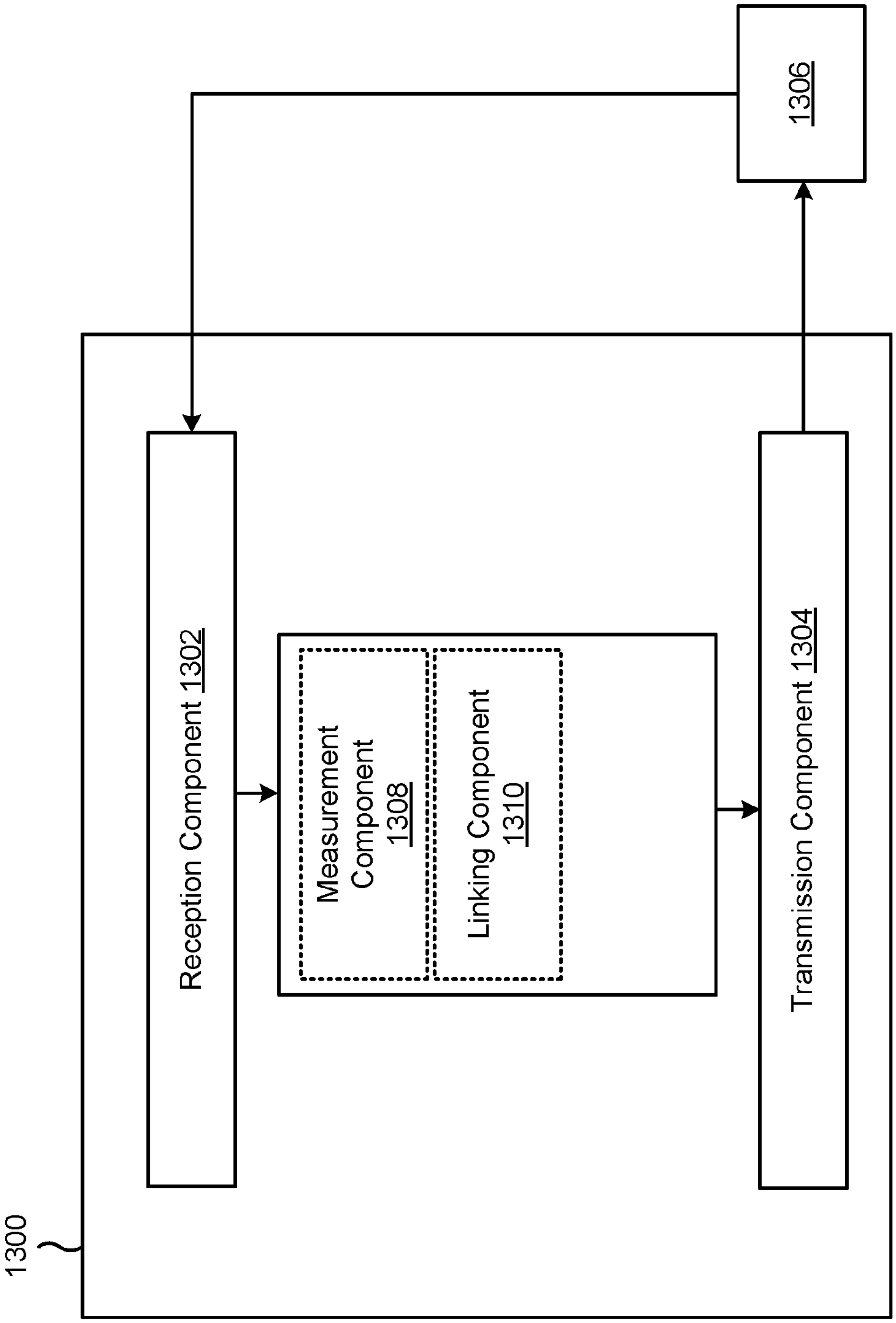
FIGS. 13-14 are block diagrams of example apparatuses for wireless communication, in accordance with the present disclosure.

FIG. 13 is a block diagram of an example apparatus 1300 for wireless communication. The apparatus 1300 may be a UE, or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include a measurement component 1308 and/or a linking component 1310, among other examples.

In some aspects, the apparatus 1300 may be configured to perform one or more operations described herein in connection with FIGS. 1-10. Additionally, or alternatively, the apparatus 1300 may be configured to perform one or more processes described herein, such as process 1100 of FIG. 11. In some aspects, the apparatus 1300 and/or one or more components shown in FIG. 13 may include one or more components of the UE described above in connection with FIG. 2. Additionally, or alternatively, one or more components shown in FIG. 13 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a demodulator, a MIMO detector, a receive processor, a controller/processor, a memory, or a combination thereof, of the UE described above in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the UE described above in connection with FIG. 2. In some aspects, the transmission component 1304 may be co-located with the reception component 1302 in a transceiver.

The measurement component 1308 may jointly measure CSI resources corresponding to a first reporting occasion of a first CSI report setting and a second reporting occasion of a second CSI report setting if the first reporting occasion is linked to the second reporting occasion based at least in part on a slot position of the first reporting occasion relative to a slot position of the second reporting occasion, wherein the first CSI report setting is associated with the second CSI report setting for reporting CSI associated with non-coherent joint transmission. The transmission component 1304 may transmit, based at least in part on the measuring, a first report for the first CSI report setting at the first reporting occasion and a second report for the second CSI report setting at the second reporting occasion.

The linking component 1310 may select the first reporting occasion or the second reporting occasion as a reference slot that indicates a slot of the other one of the first reporting occasion or the second reporting occasion.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
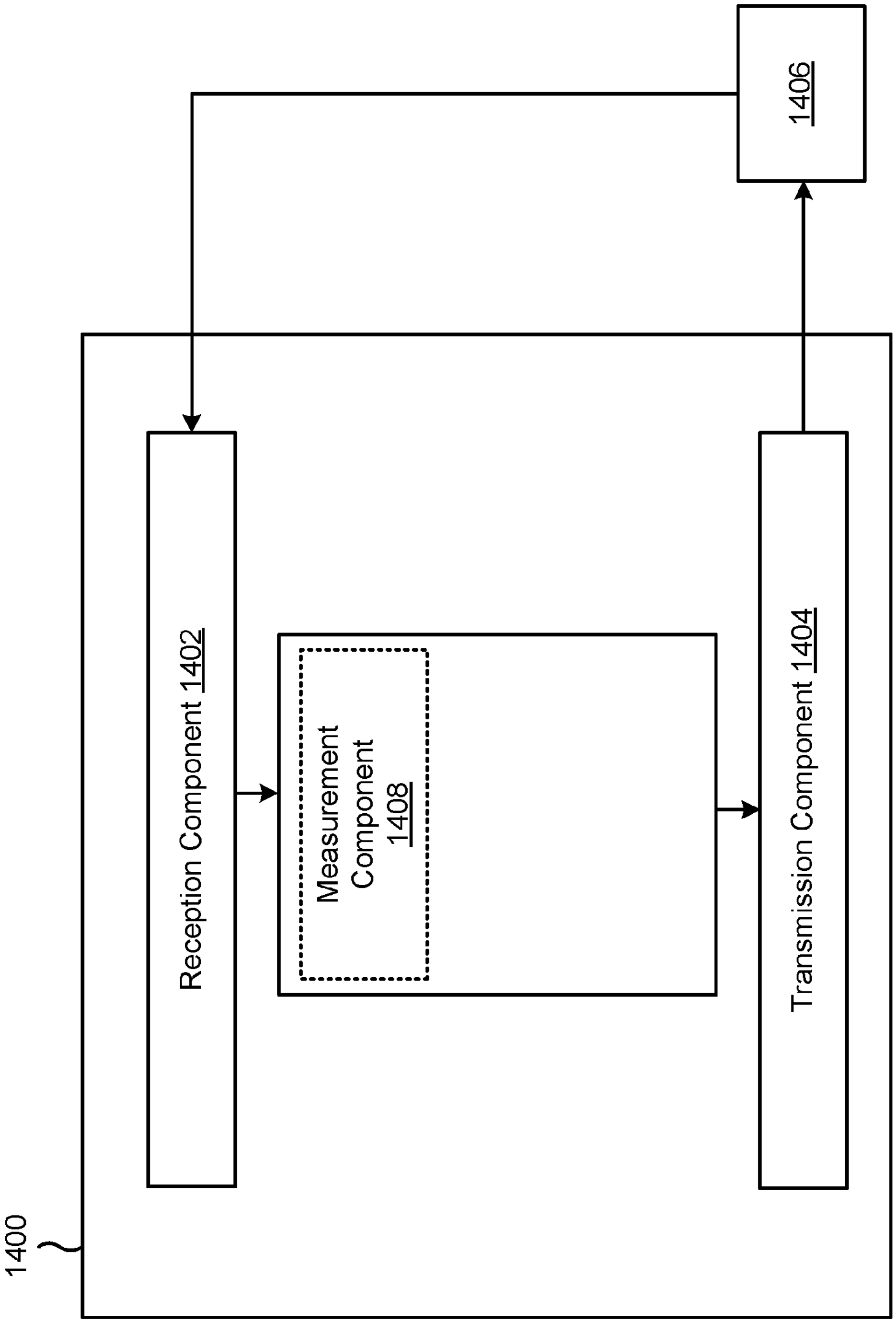

FIG. 14 is a block diagram of an example apparatus 1400 for wireless communication. The apparatus 1400 may be a UE, or a UE may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include a measurement component 1408, among other examples.

In some aspects, the apparatus 1400 may be configured to perform one or more operations described herein in connection with FIGS. 1-10. Additionally, or alternatively, the apparatus 1400 may be configured to perform one or more processes described herein, such as process 1200 of FIG. 12. In some aspects, the apparatus 1400 and/or one or more components shown in FIG. 14 may include one or more components of the UE described above in connection with FIG. 2. Additionally, or alternatively, one or more components shown in FIG. 14 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1406. In some aspects, the reception component 1402 may include one or more antennas, a demodulator, a MIMO detector, a receive processor, a controller/processor, a memory, or a combination thereof, of the UE described above in connection with FIG. 2.

The transmission component 1404 may transmit communications, such as reference signals, control information, data communications, or a combination thereof, to the apparatus 1406. In some aspects, one or more other components of the apparatus 1406 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modulator, a transmit MIMO processor, a transmit processor, a controller/processor, a memory, or a combination thereof, of the UE described above in connection with FIG. 2. In some aspects, the transmission component 1404 may be co-located with the reception component 1402 in a transceiver.

The reception component 1402 may receive an activation indication that activates one or more of a first SP CSI report setting or a second SP CSI report setting. The measurement component 1408 may jointly measure CSI resources corresponding to a first reporting occasion of the first SP CSI report setting and a second reporting occasion of the second SP CSI report setting if the first SP CSI report setting and the second SP CSI report setting are both activated and associated with each other for reporting CSI associated with non-coherent joint transmission. The transmission component 1404 may transmit, based at least in part on the measuring, a first report for the first report setting at the first reporting occasion and a second report for the second report setting at the second reporting occasion.

The reception component 1402 may receive an RRC message indicating that the first SP CSI report setting is associated with the second SP CSI report setting, and the activation indication is in a MAC-CE and activates both the first SP CSI report setting and the second SP CSI report setting.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The foregoing disclosure provides illustration and description, but is not intended to be exhaustive or to limit the aspects to the precise forms disclosed. Modifications and variations may be made in light of the above disclosure or may be acquired from practice of the aspects.

The following provides an overview of some Aspects of the present disclosure:

Aspect 1: A method of wireless communication performed by a user equipment (UE), comprising: jointly measuring channel state information (CSI) resources corresponding to a first reporting occasion of a first CSI report setting and a second reporting occasion of a second CSI report setting if the first reporting occasion is linked to the second reporting occasion based at least in part on a slot position of the first reporting occasion relative to a slot position of the second reporting occasion, wherein the first CSI report setting is associated with the second CSI report setting for reporting CSI associated with non-coherent joint transmission; and transmitting, based at least in part on the measuring, a first report for the first CSI report setting at the first reporting occasion and a second report for the second CSI report setting at the second reporting occasion.

Aspect 2: The method of Aspect 1, wherein the first CSI report setting has a same slot periodicity and a same slot offset as the second CSI report setting, and wherein the first reporting occasion and the second reporting occasion are linked based at least in part on being transmitted in a same slot.

Aspect 3: The method of Aspect 1 or 2, further comprising selecting the first reporting occasion or the second reporting occasion as a reference slot that indicates, by an offset, a slot of the other one of the first reporting occasion or the second reporting occasion.

Aspect 4: The method of Aspect 3, wherein the first reporting occasion or the second reporting occasion is selected as the reference slot based at least in part on one or more of: a configuration message that indicates one of the first CSI report setting or the second CSI report setting is a reference CSI report setting; or a result of comparing a first identifier for the first CSI report setting and a second identifier for the second CSI report setting.

Aspect 5: The method of any of Aspects 1-4, wherein the first reporting occasion and the second reporting occasion are linked if a difference of a quantity of slots from the first reporting occasion to the second reporting occasion equals a difference between an offset for a non-reference CSI report setting and an offset for a reference CSI report setting, after a modulo operation with a periodicity of the reference CSI report setting.

Aspect 6: The method of Aspect 5, wherein the first CSI report setting or the second CSI report setting is selected as the reference CSI report setting based at least in part on one or more of: a configuration message that indicates one of the first CSI report setting or the second CSI report setting is the reference CSI report setting; or a result of comparing a first identifier for the first CSI report setting and a second identifier for the second CSI report setting.

Aspect 7: The method of any of Aspects 1-6, wherein the first reporting occasion and the second reporting occasion are linked if a difference of a quantity of slots from the first reporting occasion to the second reporting occasion satisfies a distance threshold.

Aspect 8: The method of Aspect 7, wherein the first CSI report setting has a same slot periodicity as the second CSI report setting, and wherein the distance threshold is the slot periodicity divided by two.

Aspect 9: The method of any of Aspects 1-8, wherein the first reporting occasion and the second reporting occasion are linked if the second reporting occasion is a most recent reporting occasion of the second CSI report setting, with respect to the first reporting occasion.

Aspect 10: The method of any of Aspects 1-9, wherein a slot periodicity of the first CSI report setting is different than a slot periodicity of the second CSI report setting, and wherein the first reporting occasion and the second reporting occasion are linked based at least in part on a configuration indicated in a radio resource control message or based at least in part on a rule for reporting occasions that share a same slot or are in adjacent slots.

Aspect 11: A method of wireless communication performed by a user equipment (UE), comprising: receiving an activation indication that activates one or more of a first semi-persistent (SP) channel station information (CSI) report setting or a second SP CSI report setting; jointly measuring CSI resources corresponding to a first reporting occasion of the first SP CSI report setting and a second reporting occasion of the second SP CSI report setting if the first SP CSI report setting and the second SP CSI report setting are both activated and associated with each other for reporting CSI associated with non-coherent joint transmission; and transmitting, based at least in part on the measuring, a first report for the first report setting at the first reporting occasion and a second report for the second report setting at the second reporting occasion.

Aspect 12: The method of Aspect 11, further comprising receiving a radio resource control message indicating that the first SP CSI report setting is associated with the second SP CSI report setting, and wherein the activation indication is in a medium access control control element (MAC-CE) and activates both the first SP CSI report setting and the second SP CSI report setting.

Aspect 13: The method of Aspect 11 or 12, wherein the activation indication indicates that the first SP CSI report setting is associated with the second SP CSI report setting, and wherein the activation indication activates both the first SP CSI report setting and the second SP CSI report setting.

Aspect 14: The method of any of Aspects 11-13, wherein the first SP CSI report setting is associated with the second SP CSI report setting, and wherein the first SP CSI report setting and the second SP CSI report setting are both activated based at least in part on the activation indication indicating that the first SP CSI report setting or the second SP CSI report setting is activated.

Aspect 15: The method of any of Aspects 11-14, wherein the activation indication is in a medium access control control element (MAC-CE) and activates two or more SP CSI report settings, and wherein the MAC-CE includes an indication that the first SP CSI report setting is associated with the second SP CSI report setting.

Aspect 16: The method of Aspect 15, wherein the indication that the first SP CSI report setting is associated with the second SP CSI report setting includes one or more first bits in the MAC-CE different than one or more second bits in the MAC-CE corresponding to the activation indication.

Aspect 17: The method of any of Aspects 11-16, wherein the first reporting occasion and the second reporting occasion are a first two reporting occasions that are both a threshold time after a feedback message for the activation indication.

Aspect 18: The method of any of Aspects 11-17, wherein the first reporting occasion and the second reporting occasion are a first two reporting occasions that are both a threshold time after a feedback message for the activation indication, and wherein an earlier of the first reporting occasion or the second reporting occasion is a reference for the other of the first reporting occasion or the second reporting occasion.

Aspect 19: An apparatus for wireless communication at a device, comprising a processor; memory coupled with the processor; and instructions stored in the memory and executable by the processor to cause the apparatus to perform the method of one or more of Aspects 1-18.

Aspect 20: A device for wireless communication, comprising a memory and one or more processors coupled to the memory, the memory and the one or more processors configured to perform the method of one or more of Aspects 1-18.

Aspect 21: An apparatus for wireless communication, comprising at least one means for performing the method of one or more of Aspects 1-18.

Aspect 22: A non-transitory computer-readable medium storing code for wireless communication, the code comprising instructions executable by a processor to perform the method of one or more of Aspects 1-18.

Aspect 23: A non-transitory computer-readable medium storing a set of instructions for wireless communication, the set of instructions comprising one or more instructions that, when executed by one or more processors of a device, cause the device to perform the method of one or more of Aspects 1-18.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

a memory; and one or more processors, coupled to the memory, configured to:

jointly measure channel state information (CSI) resources corresponding to a first reporting occasion of a first CSI report setting and a second reporting occasion of a second CSI report setting if the first reporting occasion is linked to the second reporting occasion based at least in part on a slot position of the first reporting occasion relative to a slot position of the second reporting occasion, wherein the first CSI report setting is associated with the second CSI report setting for reporting CSI associated with non-coherent joint transmission, wherein the first CSI report setting has a same slot periodicity as the second CSI report setting, and wherein the first reporting occasion and the second reporting occasion are linked if a difference of a quantity of slots from the first reporting occasion to the second reporting occasion satisfies a distance threshold based at least in part on the slot periodicity; and transmit, based at least in part on the measuring, a first report for the first CSI report setting at the first reporting occasion and a second report for the second CSI report setting at the second reporting occasion.

2. The UE of claim 1, wherein the first CSI report setting has a same slot periodicity and a same slot offset as the second CSI report setting, and wherein the first reporting occasion and the second reporting occasion are linked based at least in part on being transmitted in a same slot.

3. The UE of claim 1, wherein the one or more processors are configured to select the first reporting occasion or the second reporting occasion as a reference slot that indicates, by an offset, a slot of the other one of the first reporting occasion or the second reporting occasion.

4. The UE of claim 3, wherein the first reporting occasion or the second reporting occasion is selected as the reference slot based at least in part on one or more of: a configuration message that indicates one of the first CSI report setting or the second CSI report setting is a reference CSI report setting; or a result of comparing a first identifier for the first CSI report setting and a second identifier for the second CSI report setting.

5. The UE of claim 1, wherein the first reporting occasion and the second reporting occasion are linked if a difference of a quantity of slots from the first reporting occasion to the second reporting occasion equals a difference between an offset for a non-reference CSI report setting and an offset for a reference CSI report setting, after a modulo operation with a periodicity of the reference CSI report setting.

6. The UE of claim 5, wherein the first CSI report setting or the second CSI report setting is selected as the reference CSI report setting based at least in part on one or more of: a configuration message that indicates one of the first CSI report setting or the second CSI report setting is the reference CSI report setting; or a result of comparing a first identifier for the first CSI report setting and a second identifier for the second CSI report setting.

7. The UE of claim 1, wherein the first reporting occasion and the second reporting occasion are linked if the second reporting occasion is a most recent reporting occasion of the second CSI report setting, with respect to the first reporting occasion.

8. The UE of claim 1, wherein a slot periodicity of the first CSI report setting is different than a slot periodicity of the second CSI report setting, and wherein the first reporting occasion and the second reporting occasion are linked based at least in part on a configuration indicated in a radio resource control message or based at least in part on a rule for reporting occasions that share a same slot or are in adjacent slots.

9. A user equipment (UE) for wireless communication, comprising:

a memory; and one or more processors, coupled to the memory, configured to:

receive an activation indication that activates one or more of a first semi-persistent (SP) channel station information (CSI) report setting or a second SP CSI report setting;

jointly measure CSI resources corresponding to a first reporting occasion of the first SP CSI report setting and a second reporting occasion of the second SP CSI report setting if the first SP CSI report setting and the second SP CSI report setting are both activated and associated with each other for reporting CSI associated with non-coherent joint transmission, wherein the first reporting occasion and the second reporting occasion are associated if a difference of a quantity of slots from the first reporting occasion to the second reporting occasion equals a difference between an offset for a non-reference CSI report setting and an offset for a reference CSI report setting, after a modulo operation with a periodicity of the reference CSI report setting; and transmit, based at least in part on the measuring, a first report for the first SP CSI report setting at the first reporting occasion and a second report for the second SP CSI report setting at the second reporting occasion.

10. The UE of claim 9, wherein the one or more processors are configured to receive a radio resource control message indicating that the first SP CSI report setting is associated with the second SP CSI report setting, and wherein the activation indication is in a medium access control control element (MAC-CE) and activates both the first SP CSI report setting and the second SP CSI report setting.

11. The UE of claim 9, wherein the activation indication indicates that the first SP CSI report setting is associated with the second SP CSI report setting, and wherein the activation indication activates both the first SP CSI report setting and the second SP CSI report setting.

12. The UE of claim 11, wherein the first SP CSI report setting is associated with the second SP CSI report setting, and wherein the first SP CSI report setting and the second SP CSI report setting are both activated based at least in part on the activation indication indicating that the first SP CSI report setting or the second SP CSI report setting is activated.

13. The UE of claim 9, wherein the activation indication is in a medium access control control element (MAC-CE) and activates two or more SP CSI report settings, and wherein the MAC-CE includes an indication that the first SP CSI report setting is associated with the second SP CSI report setting.

14. The UE of claim 13, wherein the indication that the first SP CSI report setting is associated with the second SP CSI report setting includes one or more first bits in the MAC-CE different than one or more second bits in the MAC-CE corresponding to the activation indication.

15. The UE of claim 9, wherein the first reporting occasion and the second reporting occasion are a first two reporting occasions that are both a threshold time after a feedback message for the activation indication.

16. The UE of claim 9, wherein the first reporting occasion and the second reporting occasion are a first two reporting occasions that are both a threshold time after a feedback message for the activation indication, and wherein an earlier of the first reporting occasion or the second reporting occasion is a reference for the other of the first reporting occasion or the second reporting occasion.

17. A method of wireless communication performed by a user equipment (UE), comprising:

jointly measuring channel state information (CSI) resources corresponding to a first reporting occasion of a first CSI report setting and a second reporting occasion of a second CSI report setting if the first reporting occasion is linked to the second reporting occasion based at least in part on a slot position of the first reporting occasion relative to a slot position of the second reporting occasion, wherein the first CSI report setting is associated with the second CSI report setting for reporting CSI associated with non-coherent joint transmission, wherein the first CSI report setting has a same slot periodicity as the second CSI report setting, and wherein the first reporting occasion and the second reporting occasion are linked if a difference of a quantity of slots from the first reporting occasion to the second reporting occasion satisfies a distance threshold based at least in part on the slot periodicity; and transmitting, based at least in part on the measuring, a first report for the first CSI report setting at the first reporting occasion and a second report for the second CSI report setting at the second reporting occasion.

18. The method of claim 17, wherein the first CSI report setting has a same slot periodicity and a same slot offset as the second CSI report setting, and wherein the first reporting occasion and the second reporting occasion are linked based at least in part on being transmitted in a same slot.

19. The method of claim 17, further comprising selecting the first reporting occasion or the second reporting occasion as a reference slot that indicates, by an offset, a slot of the other one of the first reporting occasion or the second reporting occasion.

20. The method of claim 17, wherein the first reporting occasion and the second reporting occasion are linked if a difference of a quantity of slots from the first reporting occasion to the second reporting occasion equals a difference between an offset for a non-reference CSI report setting and an offset for a reference CSI report setting, after a modulo operation with a periodicity of the reference CSI report setting.

21. The method of claim 17, wherein the first reporting occasion and the second reporting occasion are linked if a difference of a quantity of slots from the first reporting occasion to the second reporting occasion satisfies a distance threshold.

22. The method of claim 17, wherein the first reporting occasion and the second reporting occasion are linked if the second reporting occasion is a most recent reporting occasion of the second CSI report setting, with respect to the first reporting occasion.

23. The method of claim 17, wherein a slot periodicity of the first CSI report setting is different than a slot periodicity of the second CSI report setting, and wherein the first reporting occasion and the second reporting occasion are linked based at least in part on a configuration indicated in a radio resource control message or based at least in part on a rule for reporting occasions that share a same slot or are in adjacent slots.

24. A method of wireless communication performed by a user equipment (UE), comprising:

receiving an activation indication that activates one or more of a first semi-persistent (SP) channel station information (CSI) report setting or a second SP CSI report setting;

jointly measuring CSI resources corresponding to a first reporting occasion of the first SP CSI report setting and a second reporting occasion of the second SP CSI report setting if the first SP CSI report setting and the second SP CSI report setting are both activated and associated with each other for reporting CSI associated with non-coherent joint transmission, wherein the first reporting occasion and the second reporting occasion are associated if a difference of a quantity of slots from the first reporting occasion to the second reporting occasion equals a difference between an offset for a non-reference CSI report setting and an offset for a reference CSI report setting, after a modulo operation with a periodicity of the reference CSI report setting; and transmitting, based at least in part on the measuring, a first report for the first report SP CSI setting at the first reporting occasion and a second report for the second SP CSI report setting at the second reporting occasion.

25. The method of claim 24, further comprising receiving a radio resource control message indicating that the first SP CSI report setting is associated with the second SP CSI report setting, and wherein the activation indication is in a medium access control control element (MAC-CE) and activates both the first SP CSI report setting and the second SP CSI report setting.

26. The method of claim 24, wherein the activation indication indicates that the first SP CSI report setting is associated with the second SP CSI report setting, and wherein the activation indication activates both the first SP CSI report setting and the second SP CSI report setting.

27. The method of claim 24, wherein the first SP CSI report setting is associated with the second SP CSI report setting, and wherein the first SP CSI report setting and the second SP CSI report setting are both activated based at least in part on the activation indication indicating that the first SP CSI report setting or the second SP CSI report setting is activated.

28. The method of claim 24, wherein the first reporting occasion and the second reporting occasion are a first two reporting occasions that are both a threshold time after a feedback message for the activation indication.

29. The method of claim 24, wherein the first reporting occasion and the second reporting occasion are linked if a difference of a quantity of slots from the first reporting occasion to the second reporting occasion satisfies a distance threshold.

30. The method of claim 29, wherein the first SP CSI report setting has a same slot periodicity as the second SP CSI report setting, and wherein the distance threshold is the slot periodicity divided by two.

* * * * *